US012344400B2

(12) United States Patent
Tsujimoto et al.

(10) Patent No.: US 12,344,400 B2
(45) Date of Patent: Jul. 1, 2025

(54) BAGGAGE DEPOSIT MACHINE

(71) Applicant: DAIFUKU CO., LTD., Osaka (JP)

(72) Inventors: Kazushi Tsujimoto, Gamo-gun (JP);
Takuya Isomura, Gamo-gun (JP);
Takashi Oi, Gamo-gun (JP)

(73) Assignee: Daifuku Co., Ltd., Osaka (JP)

( * ) Notice: Subject to any disclaimer, the term of this patent is extended or adjusted under 35 U.S.C. 154(b) by 0 days.

(21) Appl. No.: 18/041,713

(22) PCT Filed: Jul. 8, 2021

(86) PCT No.: PCT/JP2021/025785
§ 371 (c)(1),
(2) Date: Feb. 15, 2023

(87) PCT Pub. No.: WO2022/038918
PCT Pub. Date: Feb. 24, 2022

(65) Prior Publication Data
US 2023/0348108 A1    Nov. 2, 2023

(30) Foreign Application Priority Data

Aug. 20, 2020    (JP) .................................. 2020-139525

(51) Int. Cl.
*B64F 1/36*    (2024.01)
*B65G 17/06*    (2006.01)

(52) U.S. Cl.
CPC .............. *B64F 1/368* (2013.01); *B64F 1/366* (2013.01); *B65G 17/066* (2013.01); *B65G 2201/0264* (2013.01)

(58) Field of Classification Search
CPC ........ B64F 1/368; B64F 1/366; B65G 17/066; B65G 2201/0264; G06F 1/1601; G06F 1/1639; G06F 3/017
See application file for complete search history.

(56) References Cited

U.S. PATENT DOCUMENTS

| 5,892,491 A | 4/1999 | Fukatsu |
| 6,108,636 A * | 8/2000 | Yap ........................... B64F 1/32 |
| | | 705/5 |

(Continued)

FOREIGN PATENT DOCUMENTS

| CN | 108196681 A | 6/2018 |
| CN | 108759712 A | 11/2018 |

(Continued)

OTHER PUBLICATIONS

International Search Report and Written Opinion with English translation thereof dated Sep. 21, 2021.

(Continued)

*Primary Examiner* — Thien M Le
*Assistant Examiner* — Asifa Habib
(74) *Attorney, Agent, or Firm* — Harness, Dickey & Pierce, P.L.C.

(57) ABSTRACT

In order to reduces a risk that a user of a baggage check-in machine is infected with a virus or the like, a baggage check-in machine (1) includes: an inner display (11) that displays an image which includes an operation target region and which is related to baggage check-in; an image formation section (30) that causes the image displayed on the inner display (11) to be formed as an aerial image in air around the baggage check-in machine (1); an operation identification section (102) that identifies an operation conducted with respect to a part in the aerial image which corresponds to the operation target region; and a process performance section (105) that carries out, in accordance with the operation which has been identified, a process related to the baggage check-in.

11 Claims, 22 Drawing Sheets

(56) References Cited

U.S. PATENT DOCUMENTS

| | | | |
|---|---|---|---|
| 6,492,961 B1 | 12/2002 | Fukatsu | |
| 6,992,587 B2* | 1/2006 | Maeda | G08B 21/24 |
| | | | 340/505 |
| 8,688,496 B1* | 4/2014 | Tansupaswatdikul | |
| | | | G06Q 10/08 |
| | | | 705/5 |
| 8,705,808 B2* | 4/2014 | Determan | G06V 40/19 |
| | | | 382/117 |
| 8,742,887 B2* | 6/2014 | Whillock | G07C 9/257 |
| | | | 340/5.82 |
| 9,567,102 B1* | 2/2017 | Ross | G01C 21/365 |
| 10,055,620 B2* | 8/2018 | Bruce | G06Q 10/083 |
| 10,252,821 B2 | 4/2019 | Dinkelmann et al. | |
| 10,518,904 B2* | 12/2019 | Kline | B64F 1/368 |
| 10,552,927 B2* | 2/2020 | Dange | G06Q 50/14 |
| 10,698,419 B2* | 6/2020 | Chang | B60L 15/00 |
| 12,106,447 B2* | 10/2024 | Kominami | G01N 1/28 |
| 2002/0176532 A1* | 11/2002 | McClelland | H04L 9/40 |
| | | | 705/13 |
| 2005/0195939 A1* | 9/2005 | Scheinman | G01N 23/046 |
| | | | 378/57 |
| 2008/0051933 A1* | 2/2008 | Vrachan | G07F 9/02 |
| | | | 700/231 |
| 2008/0313937 A1* | 12/2008 | Boyce | G09F 19/18 |
| | | | 40/212 |
| 2011/0231212 A1* | 9/2011 | Hurley | G06Q 10/02 |
| | | | 705/5 |
| 2014/0058860 A1 | 2/2014 | Roh et al. | |
| 2015/0095254 A1* | 4/2015 | Naber | G06V 30/224 |
| | | | 705/330 |
| 2015/0355471 A1 | 12/2015 | Yoneno et al. | |
| 2018/0018627 A1* | 1/2018 | Ross | G06F 16/583 |
| 2018/0144324 A1 | 5/2018 | Roh et al. | |
| 2019/0138949 A1* | 5/2019 | Malinofsky | H04W 4/029 |
| 2019/0243527 A1 | 8/2019 | Kuribayashi | |
| 2020/0324914 A1 | 10/2020 | Naber et al. | |
| 2021/0004870 A1* | 1/2021 | Ta | G06Q 30/0244 |
| 2021/0192028 A1* | 6/2021 | Tokuchi | G06F 21/32 |
| 2021/0199987 A1* | 7/2021 | Kaede | G02B 30/56 |
| 2021/0354852 A1 | 11/2021 | Naber et al. | |
| 2023/0278726 A1 | 9/2023 | Naber et al. | |
| 2024/0019715 A1* | 1/2024 | Watanabe | G06F 3/0488 |

FOREIGN PATENT DOCUMENTS

| | | |
|---|---|---|
| CN | 109643208 A | 4/2019 |
| CN | 110866944 A | 3/2020 |
| CN | 111078097 A | 4/2020 |
| EP | 2886466 A1 | 6/2015 |
| JP | 8-161987 | 6/1996 |
| JP | 2007-243634 A | 9/2007 |
| JP | 2015-232633 A | 12/2015 |
| RU | 2615062 C2 | 4/2017 |
| RU | 2616492 C2 | 4/2017 |

OTHER PUBLICATIONS

Japanese Office Action and English translation thereof for Japanese Application No. 2022- 543314 mailed Dec. 12, 2023.

TW Office Action for Taiwanese Patent Application No. 110126204 issued on Dec. 3, 2024 and English translation thereof.

Chinese Office Action for Chinese Patent Application No. 202180050164.3 issued on May 12, 2025 and English translation thereof.

* cited by examiner

FIG. 5

FIG. 7
20I
20J
20K

FIG. 8

BAGGAGE DEPOSIT MACHINE

TECHNICAL FIELD

The present invention relates to a baggage check-in machine.

BACKGROUND ART

Patent Literatures 1 and 2 disclose a self bag drop (hereinafter, referred to as "SBD") system for a user to deposit baggage by himself/herself. In the SBD system, a user operates a baggage check-in machine to deposit baggage while registering the baggage, and then the baggage is automatically conveyed.

CITATION LIST

Patent Literature

[Patent Literature 1]
Specification of European Patent Application Publication No. 2886466
[Patent Literature 2]
Specification of U.S. patent Ser. No. 10/252,821

SUMMARY OF INVENTION

Technical Problem

A conventional baggage check-in machine includes a touch panel as an interface for operation input, and a large number of users directly touch the touch panel. Therefore, the users had a risk of being infected with a virus or the like through the touch panel.

An object of an aspect of the present invention to provide a baggage check-in machine that reduces a risk of a user being infected with a virus or the like.

Solution to Problem

In order to attain the object, a baggage check-in machine in accordance with an aspect of the present invention includes: a display section that displays an image which includes an operation target region and which is related to baggage check-in; an image formation section that causes the image displayed on the display section to be formed as an aerial image in air around the baggage check-in machine; an operation identification section that identifies an operation conducted by a user with respect to a part in the aerial image which corresponds to the operation target region; and a process performance section that carries out, in accordance with the operation which has been identified, a process related to the baggage check-in.

According to the configuration, the part in the aerial image which corresponds to the operation target region is to be operated by a user of the baggage check-in machine. Therefore, the user can conduct an operation related to baggage check-in without touching an operation surface of a touch panel or the like. Therefore, it is possible to reduce the risk of infection with a virus or the like that results from contact with an operation surface, which has occurred in a conventional baggage check-in machine that includes an operation surface of a touch panel or the like.

In the baggage check-in machine in accordance with an aspect of the present invention, it is possible that: the baggage check-in machine is provided in a vicinity of a baggage placement area included in a conveyance device that conveys the baggage; the user is a person who deposits the baggage at the baggage placement area; and the display section and the image formation section are disposed such that the aerial image is formed at a position which allows the user to view the aerial image and to conduct the operation.

According to the configuration, the aerial image is formed at a position at which a user who deposits baggage can view and operate the aerial image. Therefore, it is possible to ensure viewability of the aerial image and operability of the part corresponding to the operation target region.

It is possible that the baggage check-in machine in accordance with an aspect of the present invention further includes: a face detection section that detects a position of a face of the user, the image formation section forming the aerial image toward the position which has been detected.

An aerial image generally has a narrow viewing angle (i.e., an observable range is small). Therefore, depending on a standing position of a user, the user may not be able to appropriately view the aerial image. In contrast, according to the foregoing configuration, the aerial image is formed toward a position of a face of a user who deposits baggage. Therefore, for example, even in a case where the user moves closer to the baggage placement area in order to place the baggage on the baggage placement area, the aerial image is formed toward the position of the face of the user who has moved. Further, for example, an aerial image 20 is formed toward a position corresponding to a height of the user. Therefore, it is possible to further ensure viewability of the aerial image and operability of the part corresponding to the operation target region.

In the baggage check-in machine in accordance with an aspect of the present invention, it is possible that: in a case where the position which has been detected falls within a predetermined region that includes a position at which the user faces and is in front of the baggage check-in machine, the operation identification section carries out the identification; and in a case where the position which has been detected falls outside the predetermined region, the operation identification section stops the identification.

According to the configuration, it is possible that an operation is accepted when the user exists in the predetermined region that includes a position at which the user faces and is in front of the baggage check-in machine, while a restriction is set such that an operation is not accepted otherwise. Thus, it is possible to prevent an erroneous operation by a user who is away from the position at which the user would substantially face and be in front of the baggage check-in machine.

In the baggage check-in machine in accordance with an aspect of the present invention, it is possible that: in a case where the position which has been detected falls within a predetermined region that includes a position at which the user faces and is in front of the baggage check-in machine, an object detection section carries out detection for detecting an object in a vicinity of a position at which the aerial image is formed; and in a case where the position which has been detected falls outside the predetermined region, the object detection section stops detection of the object.

According to the configuration, it is possible that an object (typically, an indicator such as a finger of the user) in the vicinity is detected in a case where the user exists in the predetermined region that includes a position at which the user faces and is in front of the baggage check-in machine, while a restriction is set such that an object in the vicinity is not detected otherwise. Thus, it is possible to prevent an erroneous operation by a user who is away from the position at which the user would substantially face and be in front of the baggage check-in machine.

It is possible that the baggage check-in machine in accordance with an aspect of the present invention further includes: a display control section that controls the display section and a display device to display the image; and a mode switching section that switches between a mode in which the display control section controls the display section to display the image and a mode in which the display control section controls the display device to display the image, the operation identification section further identifying an operation conducted with respect to the operation target region in the image which is displayed on the display device.

According to the configuration, the mode for detecting an operation conducted with respect to the part in the aerial image which corresponds to the operation target region and the mode for detecting an operation conducted with respect to the operation target region in the image displayed on the display device are switched. Therefore, for example, the former mode can be applied to a user who deposits baggage in order to reduce the risk of infection with a virus or the like, while the latter mode can be applied to employees of an airline company, maintainers, and the like to improve work efficiency.

It is possible that the baggage check-in machine in accordance with an aspect of the present invention further includes a display control section that controls a display device to display a display-only image which does not include the operation target region.

According to the configuration, in addition to the aerial image, the display-only image is displayed on the display device. Therefore, it is possible to cause the display device to display supplementary information which is not indicated in the aerial image, or information which should be constantly displayed regardless of transition of the aerial image.

Furthermore, the display surface of the display device typically has a wider viewing angle than the aerial image (i.e., the observable range is broader). Therefore, for example, in a case where the user has moved somewhat, and even in a case where there are a plurality of users at different standing positions, it is possible to maintain viewability of the display information.

In the baggage check-in machine in accordance with an aspect of the present invention, it is possible that: the aerial image is a stereoscopic image.

According to the configuration, the stereoscopic image is formed in air. Therefore, it is possible to increase understandability of a user who views the aerial image. For example, it is possible to increase understandability by illustrating a description related to a depth direction of baggage or the baggage placement area using a stereoscopic image.

It is possible that the baggage check-in machine in accordance with an aspect of the present invention further includes an image projection section that projects a projection image on a floor surface in front of the baggage check-in machine, the projection image indicating a standing position for the user.

According to the configuration, the projection image is projected on the floor surface in front of the baggage check-in machine. Therefore, the user can recognize an appropriate standing position.

It is possible that the baggage check-in machine in accordance with an aspect of the present invention further includes: a face detection section that detects a position of a face of the user; and a projection control section that determines, in accordance with the position which has been detected, a projection position of the projection image.

An aerial image generally has a narrow viewing angle (i.e., the observable range is small). Therefore, depending on a standing position of a user, the user may not be able to appropriately view the aerial image. In contrast, according to the foregoing configuration, the projection position of the projection image is determined in accordance with the detected position of the face of the user. Therefore, it is possible to indicate, to a user, a standing position at which the face of the user falls within the observable range that varies depending on the height of the user. Therefore, it is possible to ensure viewability of the aerial image and operability of the part corresponding to the operation target region.

In the baggage check-in machine in accordance with an aspect of the present invention, it is possible that: the projection control section causes the projection position to be farther away from the baggage check-in machine as a height of the position which has been detected from the floor surface increases.

The observable range of the aerial image is typically a range that extends from the aerial image upward to the front of the baggage check-in machine. Therefore, a user whose height is relatively high needs to move relatively away from the baggage check-in machine in order that the face of the user falls within the observable range, and a user whose height is relatively low needs to move relatively closer to the baggage check-in machine in order that the face of the user falls within the observable range. In other words, an appropriate standing position varies depending on the height of the face of the user. Here, according to the foregoing configuration, as the height of the detected position of the face of the user from the floor surface increases, the projection position of the projection image is caused to be farther away from the baggage check-in machine. Therefore, it is possible to indicate an appropriate standing position for any user, regardless of the height of the user.

The baggage check-in machine in accordance with each of the aspects of the present invention can be realized by a computer. In such a case, the present invention encompasses (i) a control program of the baggage check-in machine which control program causes the computer to serve as the sections (software elements) included in the baggage check-in machine for realizing the baggage check-in machine and (ii) a computer-readable storage medium storing the control program.

Advantageous Effects of Invention

According to the present invention, it is possible to reduce a risk that a user of the baggage check-in machine is infected with a virus or the like.

BRIEF DESCRIPTION OF DRAWINGS

FIG. 5 is a diagram illustrating an example of an aerial image.

FIG. 7 is a diagram illustrating an example of an aerial image.

FIG. 8 is a diagram illustrating an example of an aerial image.

DESCRIPTION OF EMBODIMENTS

Embodiment 1

The following description will discuss details of an embodiment of the present invention.

<Overview of SBD System>

Figure 1:
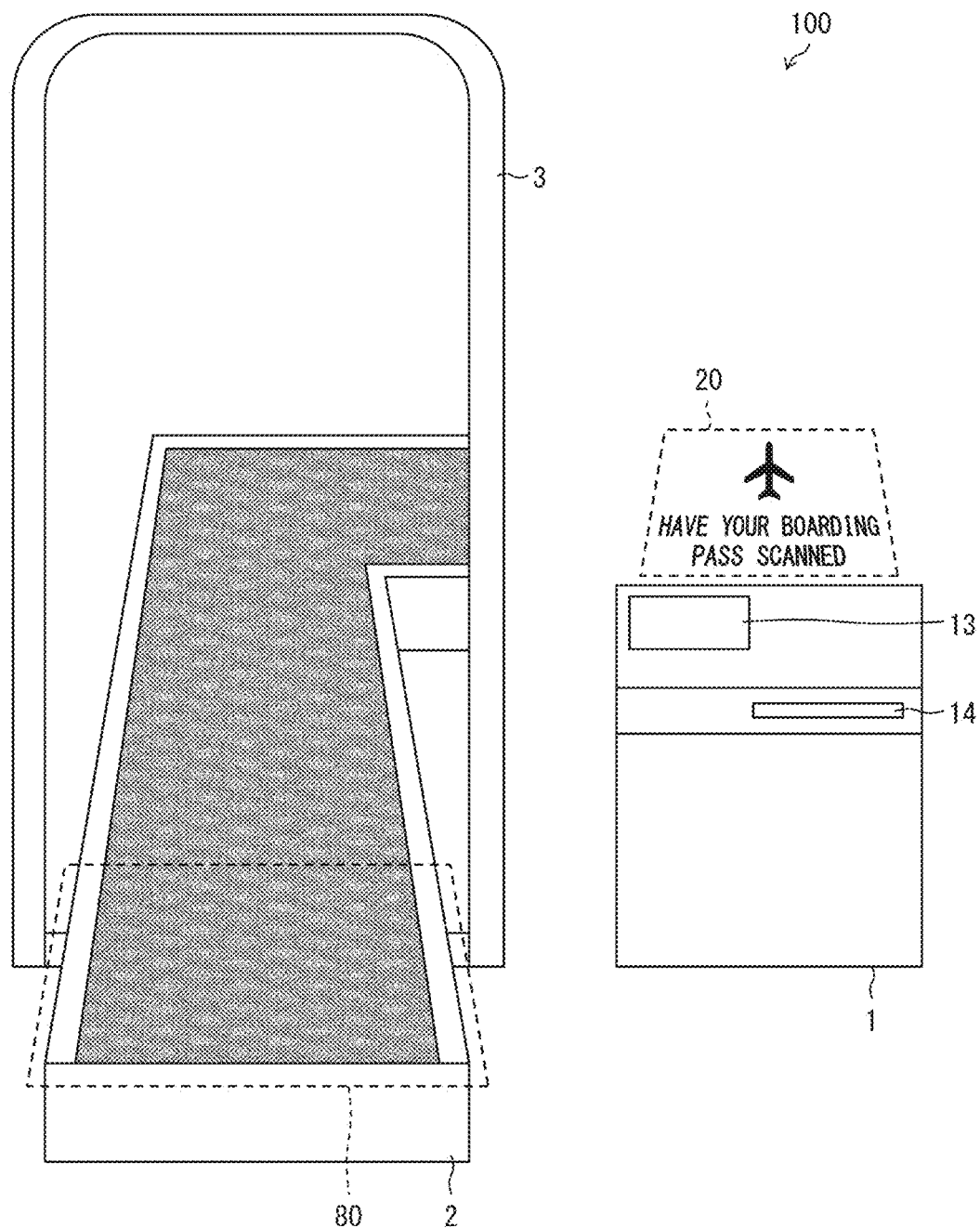
FIG. 1 is a diagram illustrating an example of baggage check-in by an SBD system that includes a baggage check-in machine in accordance with Embodiment 1.
Figure 2:
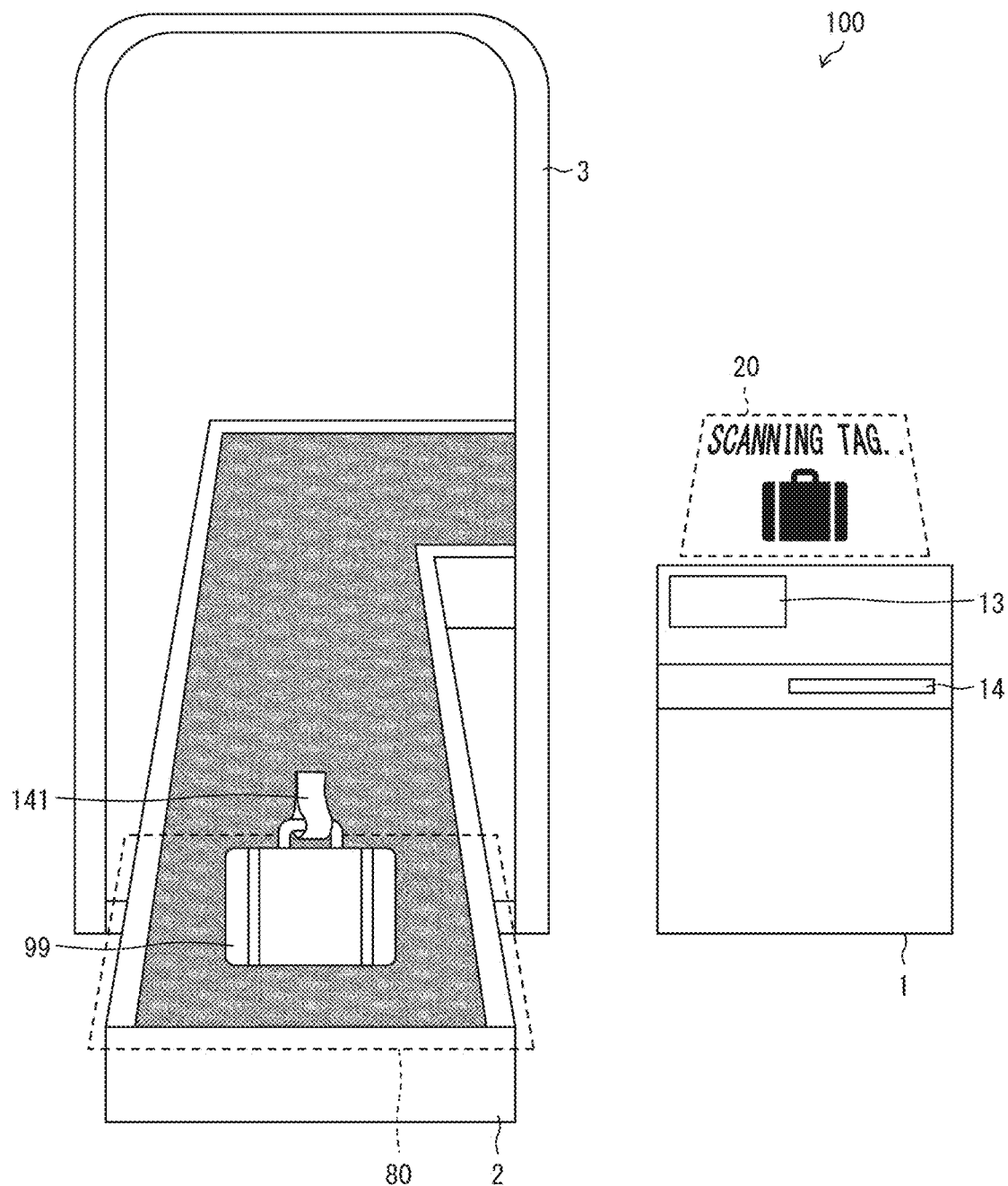
FIG. 2 is a diagram illustrating another example of baggage check-in by the SBD system illustrated in FIG. 1.

The following description will discuss an example of baggage check-in by an SBD system in accordance with Embodiment 1 with reference to FIGS. 1 and 2. FIG. 1 illustrates an SBD system 100 in accordance with the present embodiment. The SBD system 100 is mainly installed at an airport. The SBD system 100 is a system with which a user who uses the airport deposits, by himself/herself, baggage before boarding an airplane. The SBD system 100 includes a baggage check-in machine 1 and a conveyance device 2. The SBD system 100 may include a gate 3 as illustrated in FIG. 1.

The baggage check-in machine 1 is a device that is used by a user to deposit baggage, and has a function to form, in air around the baggage check-in machine 1, an aerial image 20 which includes a region for receiving operation input from the user. The aerial image 20 is formed at a position which is above the baggage check-in machine 1 and at which the user can view and operates the aerial image 20. The position at which the aerial image 20 is formed is not limited to this example, provided that the position falls within a space in which a user who deposits baggage is present. The aerial image 20 may include a region for displaying information.

The baggage check-in machine 1 includes, for example, a reader device 13 and a ticket issuance device 14 (tag issuance section, claim ticket issuance section). The reader device 13 is a device that reads information from a code (e.g., bar code, QR code (registered trademark)) that is printed on a boarding pass or the like of the user. The ticket issuance device 14 is a device that issues a baggage tag (tag) on which information pertaining to baggage is recorded, a claim ticket which is used for receiving deposited baggage at a destination, and the like.

The conveyance device 2 is a device that conveys deposited baggage for loading the baggage into an airplane which a user is to board. A typical example of the conveyance device 2 is a belt conveyor. Note, however, that the conveyance device 2 is not limited to this example.

As illustrated in FIG. 2, the user places baggage 99, to which a baggage tag 141 has been attached, on a baggage placement area 80 that constitutes a part of the conveyance device 2. The baggage placement area 80 is provided with a weight scale (not illustrated). The weight scale outputs a measured weight of the baggage 99 to the baggage check-in machine 1.

In order to efficiently use the baggage check-in machine 1 and place baggage on the baggage placement area 80, it is preferable that the baggage check-in machine 1 is provided in the vicinity of the baggage placement area 80.

The gate 3 is, for example, erected so as to straddle a part of the conveyance device 2. The gate 3 includes, for example, a camera (not illustrated). The camera is installed so as to be able to image the baggage 99 and the baggage tag 141 which pass through the gate 3, and outputs the captured image to the baggage check-in machine 1. The baggage check-in machine 1 can read a code printed on the baggage tag 141 and identify dimensions and a shape of the baggage 99 based on the image which has been obtained. The aerial image 20 illustrated in FIG. 2 shows that the code printed on the baggage tag 141 is being read (being scanned).

The gate 3 does not need to be separate from the conveyance device 2, and may be provided integrally with the conveyance device 2 as a constituent member of the conveyance device 2.

<Method of Forming Aerial Image 20 and Method of Detecting Operation>

Figure 3:
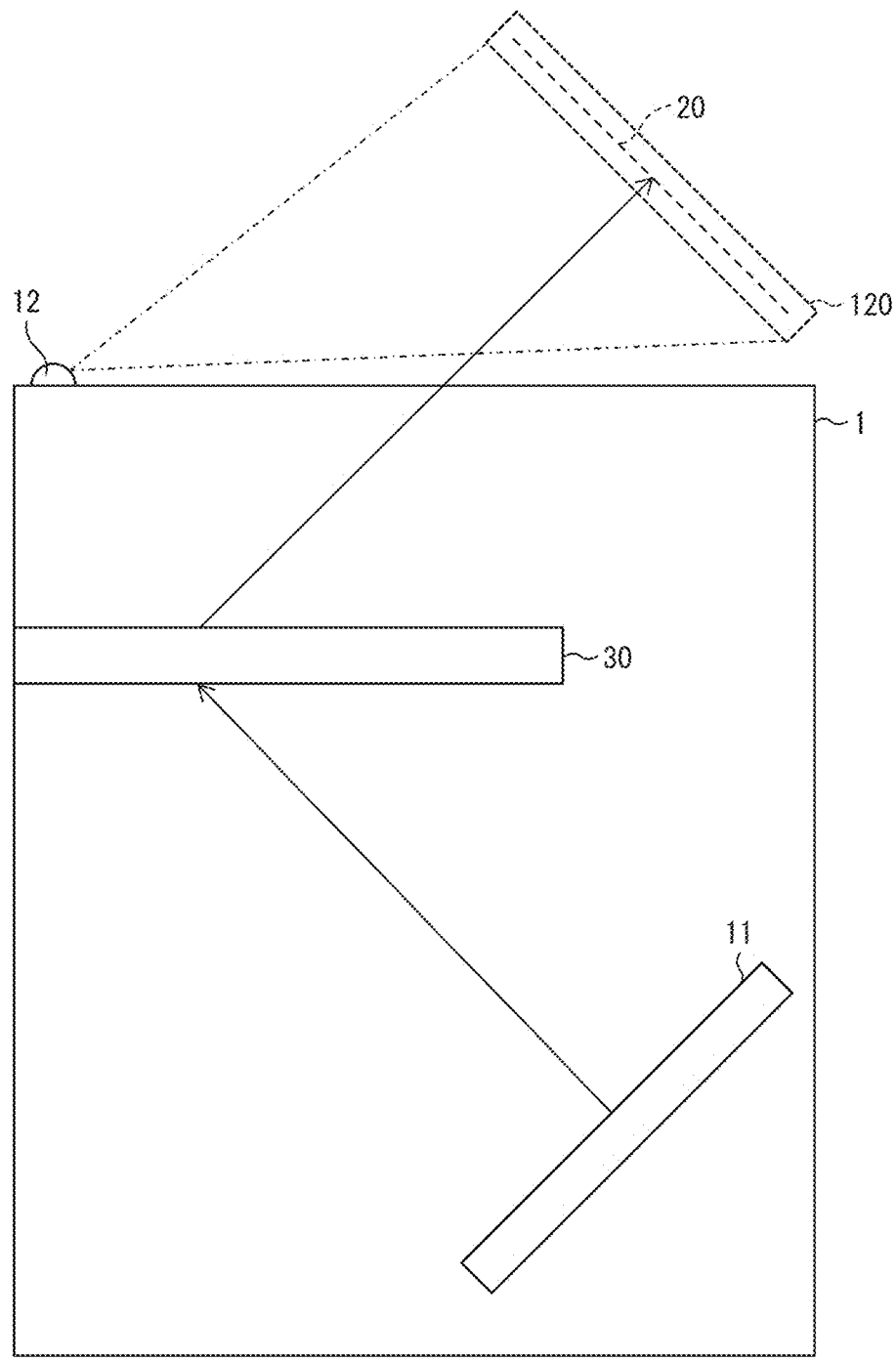
FIG. 3 is a diagram illustrating an example of a method for forming an aerial image by the baggage check-in machine illustrated in FIG. 1.

FIG. 3 is a diagram illustrating an example of a method for forming an aerial image 20. The baggage check-in machine 1 includes an inner display 11 (display section), an image formation section 30, and an operation detection section 12 (object detection section).

The inner display 11 is a display that displays an image which is related to baggage check-in and which is a base of an aerial image 20. The inner display 11 is typically a liquid crystal display. The image formation section 30 causes an image displayed on the inner display 11 to be formed in air around the baggage check-in machine 1. The image formation method may be a well-known method. For example, the image formation section 30 refracts and emits light which has entered the image formation section 30 from the inner display 11, concentrates the light at a position that is line-symmetrical to the inner display 11, and thus forms an aerial image 20. In the example of FIG. 3, the aerial image 20 is formed above a top surface of the baggage check-in machine 1. The image formation method described here is merely an example, and the method for forming the aerial image 20 is not limited to this example. It is also possible to employ a configuration in which a plurality of image formation sections 30 are provided to refract light in multiple stages.

The operation detection section 12 detects an object (typically, an indicator such as a finger of the user) in a vicinity 120 of a position at which the aerial image 20 is formed, and outputs a detection signal. The operation detection section 12 may detect a position of an object in the vicinity 120. The operation detection section 12 is constituted by, for example, a non-contact sensor that includes an infrared sensor and the like. The operation detection section 12 is provided, for example, on the top surface of the baggage check-in machine 1.

<Main Part Configuration of Baggage Check-In Machine 1>

Figure 4:
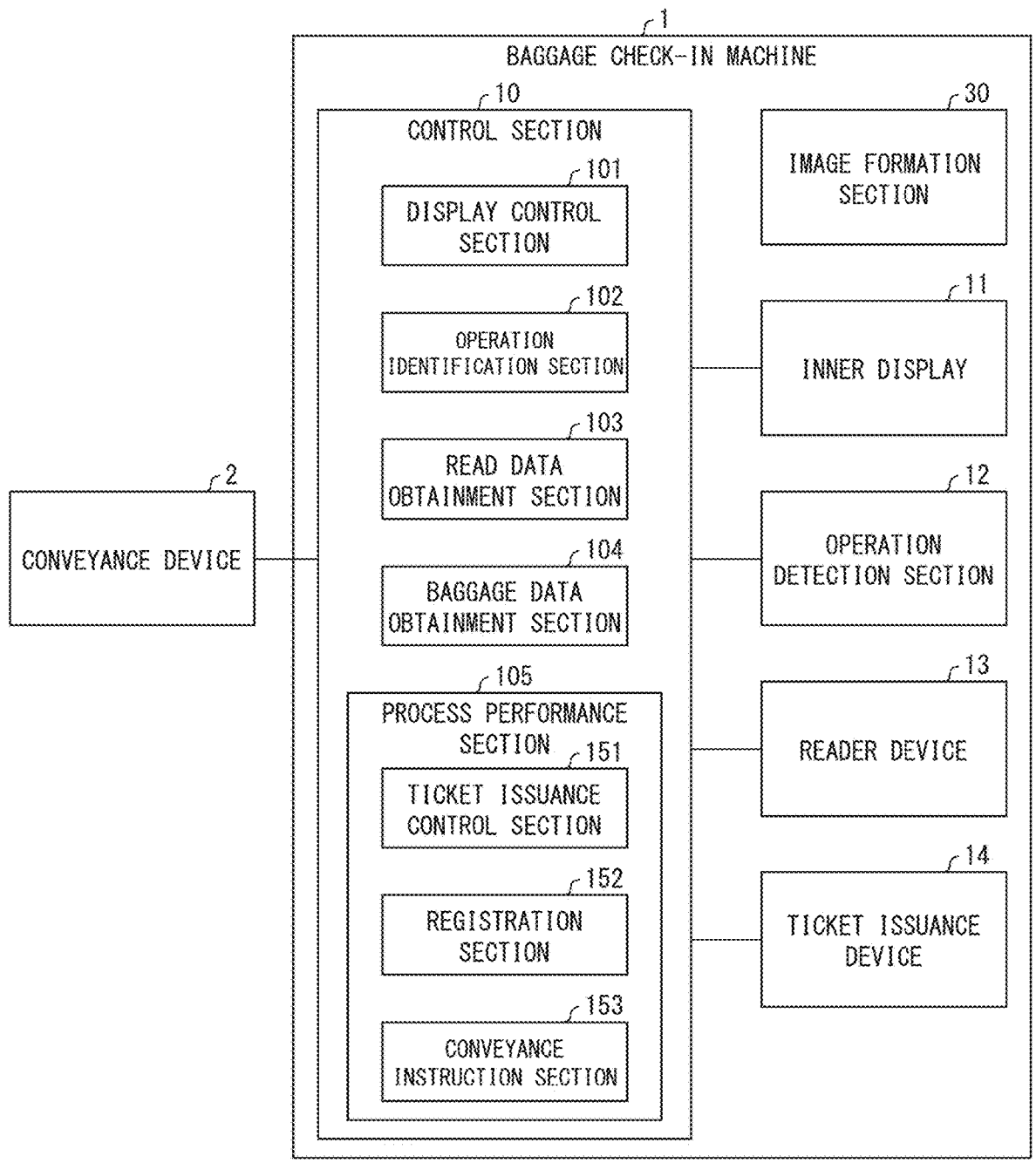
FIG. 4 is a block diagram illustrating an example of a main part configuration of the baggage check-in machine illustrated in FIG. 1.

FIG. 4 is a block diagram illustrating an example of a main part configuration of the baggage check-in machine 1. The baggage check-in machine 1 includes a control section 10, the inner display 11, the operation detection section 12, the reader device 13, the ticket issuance device 14, and the image formation section 30. The inner display 11, the operation detection section 12, the reader device 13, the ticket issuance device 14, and the image formation section have already been described. Therefore, descriptions of these members will not be repeated here.

The control section 10 collectively controls sections of the baggage check-in machine 1. The control section 10 includes a display control section 101, an operation identification section 102, a read data obtainment section 103, a baggage data obtainment section 104, and a process performance section 105.

The display control section 101 controls the inner display 11 to display an image which is a base of an aerial image 20. The image to be displayed on the inner display 11 includes a display region and an operation target region. The display region is a region that displays information to be presented to the user. The operation target region is, for example, a region that simulates an input interface such as a button. A part in the aerial image 20 that corresponds to the operation target region corresponds to a graphical user interface (hereinafter, referred to as "GUI"). Hereinafter, an operation in which a user brings an indicator closer to the GUI may be simply referred to as "operation".

The operation identification section 102 obtains a detection signal from the operation detection section 12. The operation identification section 102 identifies an operation based on the obtained detection signal and an image which the display control section 101 controls the inner display 11 to display. The operation identification section 102 outputs an instruction corresponding to the identified operation to each section of the control section 10. For example, the operation identification section 102 outputs an instruction to the display control section 101 to switch an image to be displayed on the inner display 11. For example, the operation identification section 102 instructs a ticket issuance control section 151 of the process performance section 105 to issue a baggage tag or claim ticket. For example, the operation identification section 102 instructs a conveyance instruction section 153 of the process performance section 105 to convey baggage. For example, the operation identification section 102 instructs a registration section 152 of the process performance section 105 to register various kinds of information.

The read data obtainment section 103 obtains data which has been read by the reader device 13 and outputs an instruction corresponding to the obtained data to each section of the control section 10. For example, the read data obtainment section 103 outputs an instruction to the display control section 101 to switch an image to be displayed on the inner display 11.

The baggage data obtainment section 104 obtains data related to baggage from the conveyance device 2 and the gate 3 and outputs an instruction corresponding to the obtained data to each section of the control section 10. Specifically, the baggage data obtainment section 104 obtains data indicating a weight of baggage measured by the weight scale provided in the conveyance device 2 and an image captured by the camera provided in the gate 3. Note that these pieces of data are merely examples, and data obtained by the baggage data obtainment section 104 is not limited to these.

The process performance section 105 carries out various processes related to baggage check-in. The process performance section 105 includes the ticket issuance control section 151, the registration section 152, and the conveyance instruction section 153.

The ticket issuance control section 151 outputs a ticket issuance instruction to the ticket issuance device 14 to cause the ticket issuance device 14 to issue a baggage tag or claim ticket.

The registration section 152 registers information of baggage that has been deposited. For example, the registration section 152 causes a storage section (not illustrated) to store information pertaining to the deposited baggage in association with information pertaining to a boarding pass of the user. The information pertaining to baggage is, for example, an ID for identifying the baggage. The information pertaining to the boarding pass is, for example, information which is read from the boarding pass by the reader device 13 and includes pieces of information for identifying a user, an airplane to be boarded, a destination, and the like.

The conveyance instruction section 153 outputs a conveyance instruction to the conveyance device 2 to cause the conveyance device 2 to convey the baggage 99. The conveyance instruction section 153 may output a conveyance stop instruction to the conveyance device 2 to stop conveyance of baggage.

<Flow of Baggage Check-In Process in SBD System 100>

Figure 5:
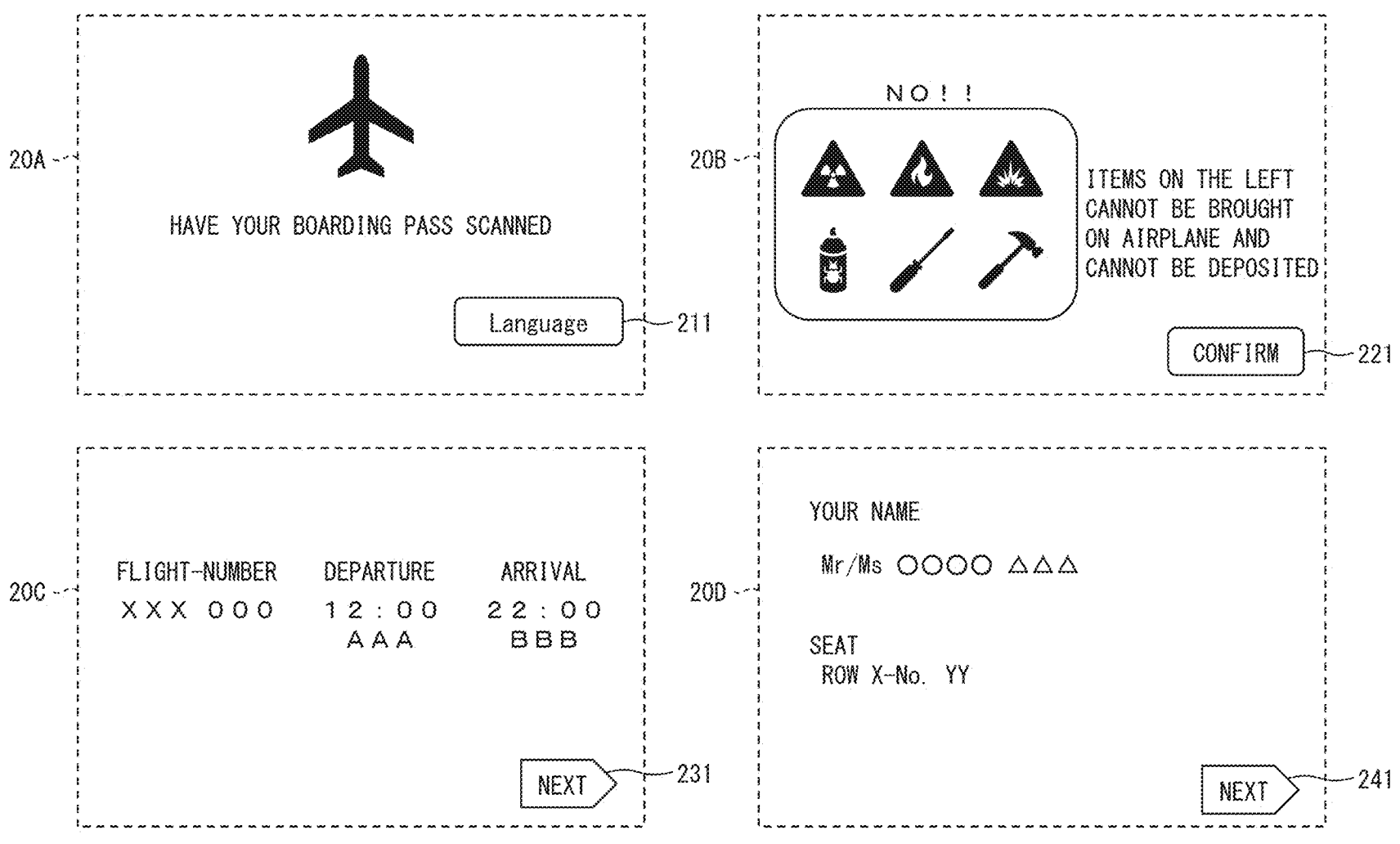
Figure 6:
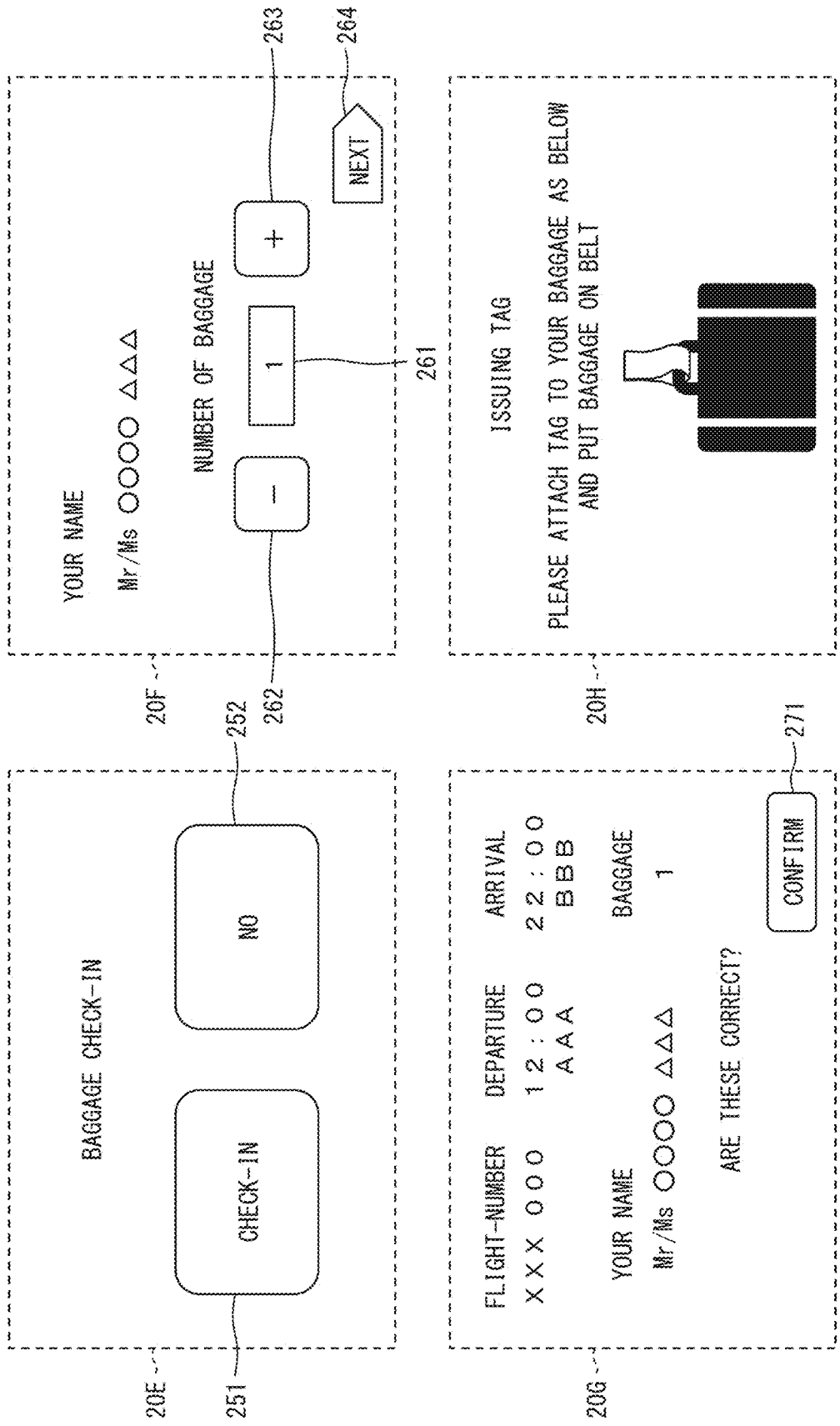
FIG. 6 is a diagram illustrating an example of an aerial image.

The following description will discuss an example flow of a baggage check-in process in the SBD system 100 with reference to FIGS. 5 through 7. FIGS. 5 through 7 are diagrams each illustrating an example of the aerial image 20 which changes in accordance with the progress of the baggage check-in process. In this example, it is assumed that the user has obtained a boarding pass. The boarding pass may be issued from a device different from the baggage check-in machine 1 or may be a so-called mobile boarding pass which can be viewed through a mobile terminal or the like.

First, an aerial image 20A illustrated in FIG. 5 is an example of an aerial image which is formed by the baggage check-in machine 1 at the start of the baggage check-in process. The aerial image 20A indicates information for prompting the user to cause a boarding pass to be read. The user causes the reader device 13 of the baggage check-in machine 1 to read a code of the boarding pass in accordance with displayed content of the aerial image 20A. The reader device 13 outputs read information which has been read from the code to the read data obtainment section 103. The read data obtainment section 103 outputs the obtained read information to the display control section 101 and to the registration section 152.

The aerial image 20A illustrated in FIG. 5 includes a button 211 as an example of a GUI. The display control section 101, based on the fact that a detection signal indicating an operation of the button 211 has been obtained, causes the inner display 11 to display, for example, an image (not illustrated) for causing the user to select a language.

Next, an aerial image 20B illustrated in FIG. 5 is an example of an aerial image which is formed by the baggage check-in machine 1 after the code of the boarding pass has been read. The aerial image 20B is formed as follows: that is, the display control section 101 which has obtained, from the read data obtainment section 103, the read information which had been read by the reader device 13 causes the inner display 11 to display an image which is to be a base of the aerial image 20B. Aerial images which will each appear in the following descriptions are also formed by the display control section 101 causing the inner display 11 to display an image which is a base of the aerial image.

The aerial image 20B indicates information pertaining to items which cannot be brought in airplanes and cannot be deposited. The aerial image 20B includes a button 221 as an example of the GUI. The user confirms displayed content of the aerial image 20B and operates the button 221.

Next, an aerial image 20C illustrated in FIG. 5 is an example of an aerial image which is formed by the baggage check-in machine 1 in a case where the button 221 has been operated. The aerial image 20C indicates information pertaining to an airplane which the user is to board. The information is information which has been read from the boarding pass by the reader device 13. The aerial image 20C includes a button 231 as an example of the GUI. The user confirms displayed content of the aerial image 20C and operates the button 231.

Next, an aerial image 20D illustrated in FIG. 5 is an example of an aerial image which is formed by the baggage check-in machine 1 in a case where the button 231 has been operated. The aerial image 20D indicates information of a name of the user and a seat number in the airplane. These pieces of information are information which has been read from the boarding pass by the reader device 13. The aerial image 20D includes a button 241 as an example of the GUI. The user confirms displayed content of the aerial image 20D and operates the button 241.

Next, an aerial image 20E illustrated in FIG. 6 is an example of an aerial image which is formed by the baggage check-in machine 1 in a case where the button 241 has been operated. The aerial image 20E is an image for causing the user to select whether or not to conduct baggage check-in. The aerial image 20E includes, as an example of the GUI, a button 251 and a button 252. The user operates the button 251 in a case where the user conducts baggage check-in, and operates the button 252 in a case where the user does not conduct baggage check-in. Note that, in a case where the button 252 is operated, the baggage check-in process in the SBD system 100 ends.

Next, an aerial image 20F illustrated in FIG. 6 is an example of an aerial image which is formed by the baggage check-in machine 1 in a case where the button 251 has been operated. The aerial image 20F is an image for causing the user to input the number of pieces of baggage to be deposited. The aerial image 20F includes, for example, a counter 261 for displaying the input number, a button 262 for inputting an operation to reduce the number, a button 263 for inputting an operation to increase the number, and a button 264 for determining the number. The button 262, the button 263 and the button 264 are GUIs. The user operates the button 262 to reduce the number of pieces of baggage, and operates the button 263 to increase the number of pieces of baggage. When the input of the number of pieces of baggage is completed, the user operates the button 264.

Next, an aerial image 20G illustrated in FIG. 6 is an example of an aerial image which is formed by the baggage check-in machine 1 in a case where the button 264 has been operated. The aerial image 20G indicates information of the boarding pass which has been read by the reader device 13, and the number of pieces of baggage which has been input by the user. The aerial image 20G includes a button 271 as an example of the GUI. The user confirms displayed content of the aerial image 20G and operates the button 271.

Next, an aerial image 20H illustrated in FIG. 6 is an example of an aerial image which is formed by the baggage check-in machine 1 in a case where the button 271 has been operated. The aerial image 20H shows a message indicating that a baggage tag is being issued and a method for attaching the issued baggage tag to the baggage.

While the aerial image 20H is being formed, the ticket issuance control section 151, which has received an instruction from the operation identification section 102, causes the ticket issuance device 14 to issue a baggage tag. The ticket issuance device 14 issues baggage tags by the same number of pieces as the number of pieces of baggage which has been input through the aerial image 20F. The user attaches the issued baggage tag to the baggage as indicated in the aerial image 20H and places the baggage on the baggage placement area 80. The weight scale provided in the baggage placement area 80 measures a weight of the baggage placed and outputs weight data indicating the weight to the baggage check-in machine 1.

The baggage data obtainment section 104 of the baggage check-in machine 1 outputs the weight data obtained from the weight scale to the display control section 101. The baggage data obtainment section 104 notifies the conveyance instruction section 153 that the weight data has been obtained. The conveyance instruction section 153 outputs a conveyance instruction to the conveyance device 2 so that the baggage placed on the baggage placement area 80 is moved to a position of the gate 3. The conveyance device 2 activates the camera provided in the gate 3 and starts imaging of the baggage including scanning of the baggage tag. The conveyance device 2 outputs, to the baggage check-in machine 1, a fact that scanning is being carried out.

Next, an aerial image 20I illustrated in FIG. 7 is an example of an aerial image which is formed by the baggage check-in machine 1 during scanning. The aerial image 20I shows a message indicating that the baggage tag is being scanned.

Upon completion of imaging of the baggage, the camera provided in the gate 3 outputs the captured image to the baggage check-in machine 1. The baggage data obtainment section 104 outputs the image obtained from the camera to the registration section 152.

The registration section 152 carries out image recognition on the image obtained from the baggage data obtainment section 104 and identifies an ID for identifying baggage indicated in the baggage tag. Note that a well-known technique can be used for image recognition. The registration section 152 associates the identified ID with the read information, that is, the information of the boarding pass which has been obtained from the operation identification section 102, and causes the storage section to store the ID and the read information. The registration section 152 notifies the display control section 101, the ticket issuance control section 151, and the conveyance instruction section 153 that the process has been completed.

Next, an aerial image 20J illustrated in FIG. 7 is an example of an aerial image which is formed by the baggage check-in machine 1 during issuance of a claim ticket. The aerial image 20J shows a message indicating that a claim ticket is being issued.

The ticket issuance control section 151 causes, based on the notification from the registration section 152, the ticket issuance device 14 to issue a claim ticket. The ticket issuance device 14 issues a claim ticket. When the issuance of the claim ticket is completed, the ticket issuance control section 151 notifies the display control section 101 of the completion of issuance. Meanwhile, the conveyance instruction section 153 outputs, based on the notification from the registration section 152, a conveyance instruction to the conveyance device 2 to convey the baggage on the conveyance device 2 to a loading point.

Next, an aerial image 20K illustrated in FIG. 7 is an example of an aerial image which is formed by the baggage check-in machine 1 at completion of the baggage check-in process. The aerial image 20K shows a message indicating that baggage check-in has been completed and that a claim ticket has been issued.

<Other Examples of Aerial Image 20>

An aerial image 20L illustrated in FIG. 8 is an example of an aerial image which is formed by the baggage check-in machine 1 in a case where a weight of baggage placed on the baggage placement area 80 exceeds a predetermined weight. For example, in a case where the weight of the baggage placed exceeds the predetermined weight, the weight scale outputs weight data to the baggage check-in machine 1 along with excess information indicating that the weight exceeds the predetermined weight. Upon obtainment of the excess information, the baggage data obtainment section 104 outputs the excess information to the display control section 101.

In the aerial image 20L, information pertaining to overweight is indicated. The aerial image 20L includes a button 311 as an example of the GUI. The user confirms displayed content of the aerial image 20L and operates the button 311.

An aerial image 20M illustrated in FIG. 8 is an example of an aerial image which is formed by the baggage check-in machine 1 in a case where it is necessary to put, on a tray, baggage which has been placed on the baggage placement area 80. For example, in a case where the baggage data obtainment section 104 has identified, as a result of carrying out image recognition of an image which has been captured by the camera provided in the gate 3, that the baggage should be placed on the tray from the dimensions and shape of the baggage, the baggage data obtainment section 104 notifies the display control section 101 of the identification result.

The aerial image 20M indicates information prompting the user to put baggage on the tray. The aerial image 20M includes a button 321 as an example of the GUI. The user confirms displayed content of the aerial image 20M and operates the button 321.

Functions and Effects

As described above, the baggage check-in machine 1 in accordance with the present embodiment includes the inner display 11 that displays an image which is related to baggage check-in and which includes the operation target region. The baggage check-in machine 1 includes the image formation section 30 that causes the image to be formed as an aerial image 20 in air around the baggage check-in machine 1. The baggage check-in machine 1 includes the operation identification section 102 that identifies an operation conducted with respect to the GUI, which is a part of the aerial image 20 and corresponds to the operation target region. The baggage check-in machine 1 includes the process performance section 105 that carries out processes related to baggage check-in in accordance with the operation which has been identified.

According to the configuration described above, the GUI included in the aerial image 20 is to be operated by a user of the baggage check-in machine 1. Therefore, the user can conduct an operation related to baggage check-in without touching an operation surface of a touch panel or the like. This makes it possible to reduce the risk of infection with a virus or the like that results from contact with an operation surface, which has occurred in a conventional baggage check-in machine that includes an operation surface of a touch panel or the like.

The baggage check-in machine 1 is provided in the vicinity of the baggage placement area 80 included in the conveyance device 2. The inner display 11 and the image formation section 30 are disposed such that the aerial image is formed at a position at which the aerial image 20 is visible to and operatable by the user. Therefore, it is possible to ensure viewability of the aerial image 20 and operability of the GUI included in the aerial image 20.

The operation target region includes, for example, a region for inputting a confirmation result. Thus, the aerial image 20 includes, for example, GUIs (e.g., buttons 221, 231, 241, 264, 271, 311 and 321) for inputting confirmation results. According to this configuration, various confirmation results can be input by non-contact operations.

The operation target region includes, for example, a region for inputting the number of pieces of baggage. Thus, the aerial image 20 includes, for example, GUIs (e.g., buttons 262 and 263) for inputting the number of pieces of baggage. According to this configuration, the number of pieces of baggage can be input by a non-contact operation.

The baggage check-in machine 1 includes the ticket issuance device 14 that issues a baggage tag. The ticket issuance control section 151 included in the process performance section 105 instructs the ticket issuance device 14 to issue a baggage tag. According to this configuration, the baggage tag is issued by a non-contact operation.

The ticket issuance device 14 issues a claim ticket. The ticket issuance control section 151 instructs the ticket issuance device 14 to issue a claim ticket. According to this configuration, the claim ticket is issued by a non-contact operation.

The conveyance instruction section 153 included in the process performance section 105 instructs the conveyance device 2 to convey baggage that is deposited. According to this configuration, the baggage is conveyed by a non-contact operation.

Embodiment 2

Another embodiment of the present invention will be described below. For convenience of explanation, in embodiments described below, the same reference numerals are given to constituent members which have functions identical with those described in Embodiment 1, and descriptions regarding such constituent members will not be repeated.

Overview of Embodiment 2

Figure 9:
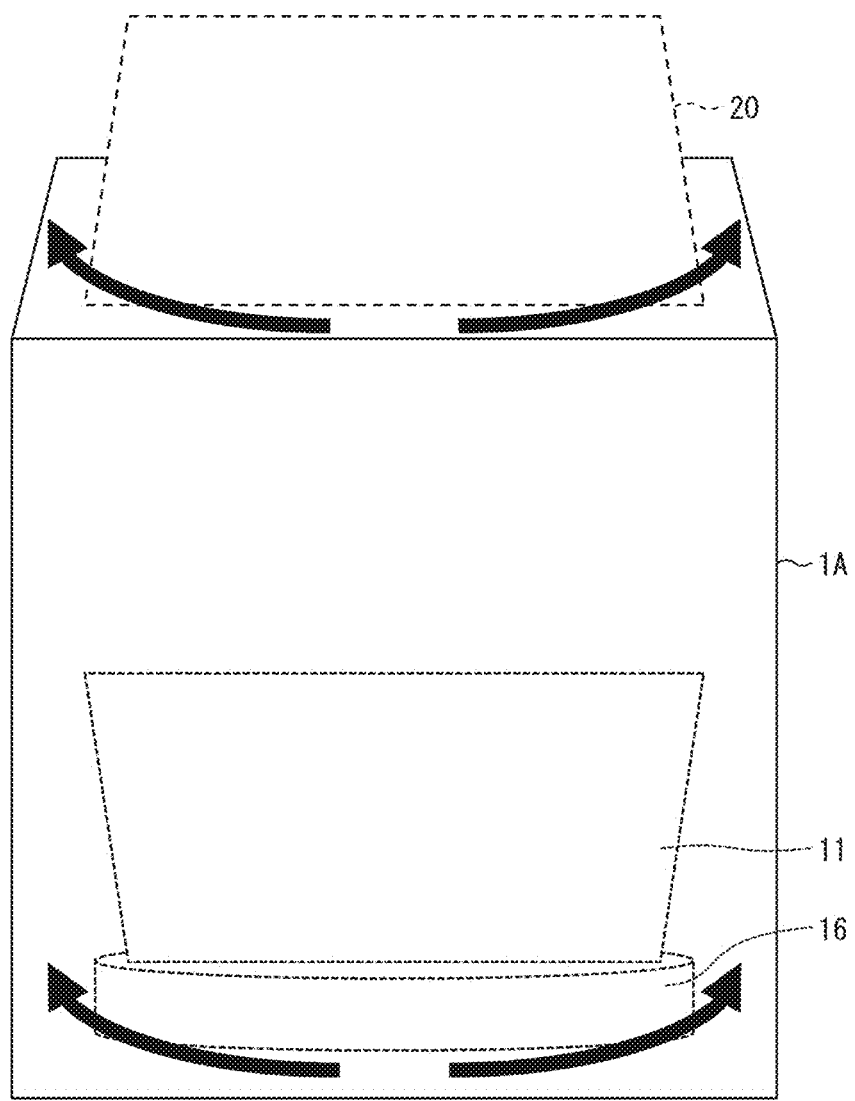
FIG. 9 is a diagram schematically illustrating a baggage check-in machine in accordance with Embodiment 2.

FIG. 9 is a diagram schematically illustrating a baggage check-in machine 1A in accordance with Embodiment 2.

The baggage check-in machine 1A adjusts a direction in which an aerial image 20 is formed. Specifically, the baggage check-in machine 1A forms the aerial image 20 toward a position of a face of a user. In order to realize this function, the baggage check-in machine 1A includes an actuator 16 that changes an orientation of a display surface of an inner display 11. For example, the actuator 16 is rotated about a straight axis extending in the vertical direction of the baggage check-in machine 1A while the inner display 11 is placed on the actuator 16, as illustrated in FIG. 9. Thus, the orientation of the display surface of the inner display 11 is changed, and accordingly the direction in which the aerial image 20 is formed is changed in accordance with this change. In this manner, the aerial image 20 is adjusted such that the face of the user falls within an observable range. Therefore, it is possible to ensure viewability of the aerial image 20 even when a standing position of the user changes.

<Main Part Configuration of Baggage Check-In Machine 1A>

Figure 10:
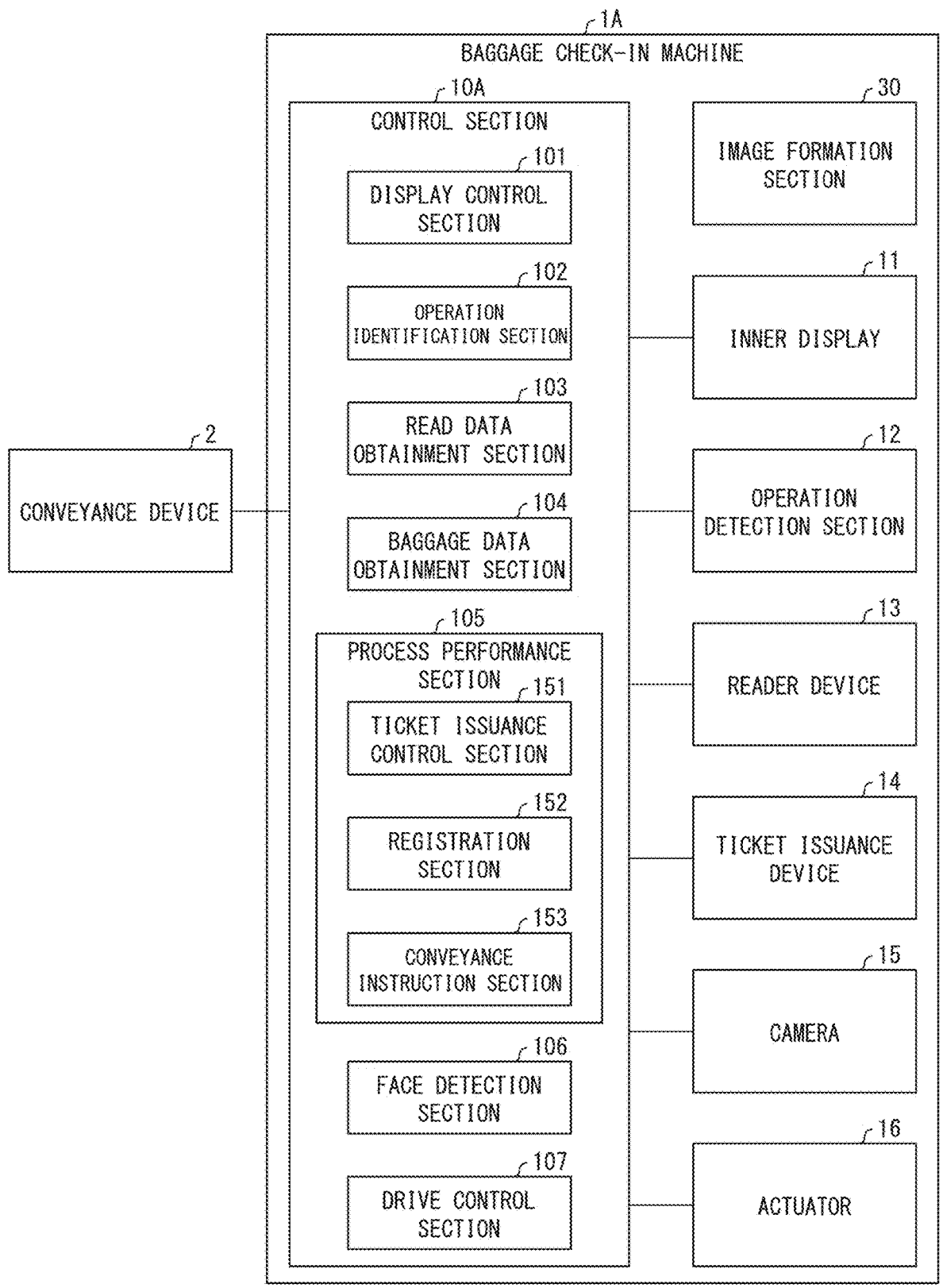
FIG. 10 is a block diagram illustrating an example of a main part configuration of the baggage check-in machine illustrated in FIG. 9.

FIG. 10 is a block diagram illustrating an example of a main part configuration of the baggage check-in machine 1A. The baggage check-in machine 1A is different from the baggage check-in machine 1 described above in that the baggage check-in machine 1A includes a control section 10A instead of the control section 10, and includes a camera 15 and the actuator 16.

The camera 15 is provided at a position at which the camera 15 can image a face of a user of the baggage check-in machine 1A, and outputs the captured image to the control section 10A. In view of the fact that the user moves in order to place baggage on the baggage placement area 80, it is preferable that the camera 15 has an angle of view with which an area near to the baggage placement area 80 can also be imaged.

The actuator 16 changes, in accordance with control by the control section 10A, the orientation of the display surface of the inner display 11 as described above.

The control section 10A is different from the control section 10 described above in that the control section 10A includes a face detection section 106 and a drive control section 107.

The face detection section 106 detects, from the image obtained from the camera 15, a position of the face of the user of the baggage check-in machine 1A. The face detection section 106 outputs position information indicating the position which has been detected to the drive control section 107.

The drive control section 107 controls, based on the position information which has been obtained, the actuator 16 in order to adjust the orientation of the display surface of the inner display 11 such that the aerial image 20 is formed toward the position of the face of the user.

<Specific Example of Adjusting Image Formation Direction>

Figure 11:
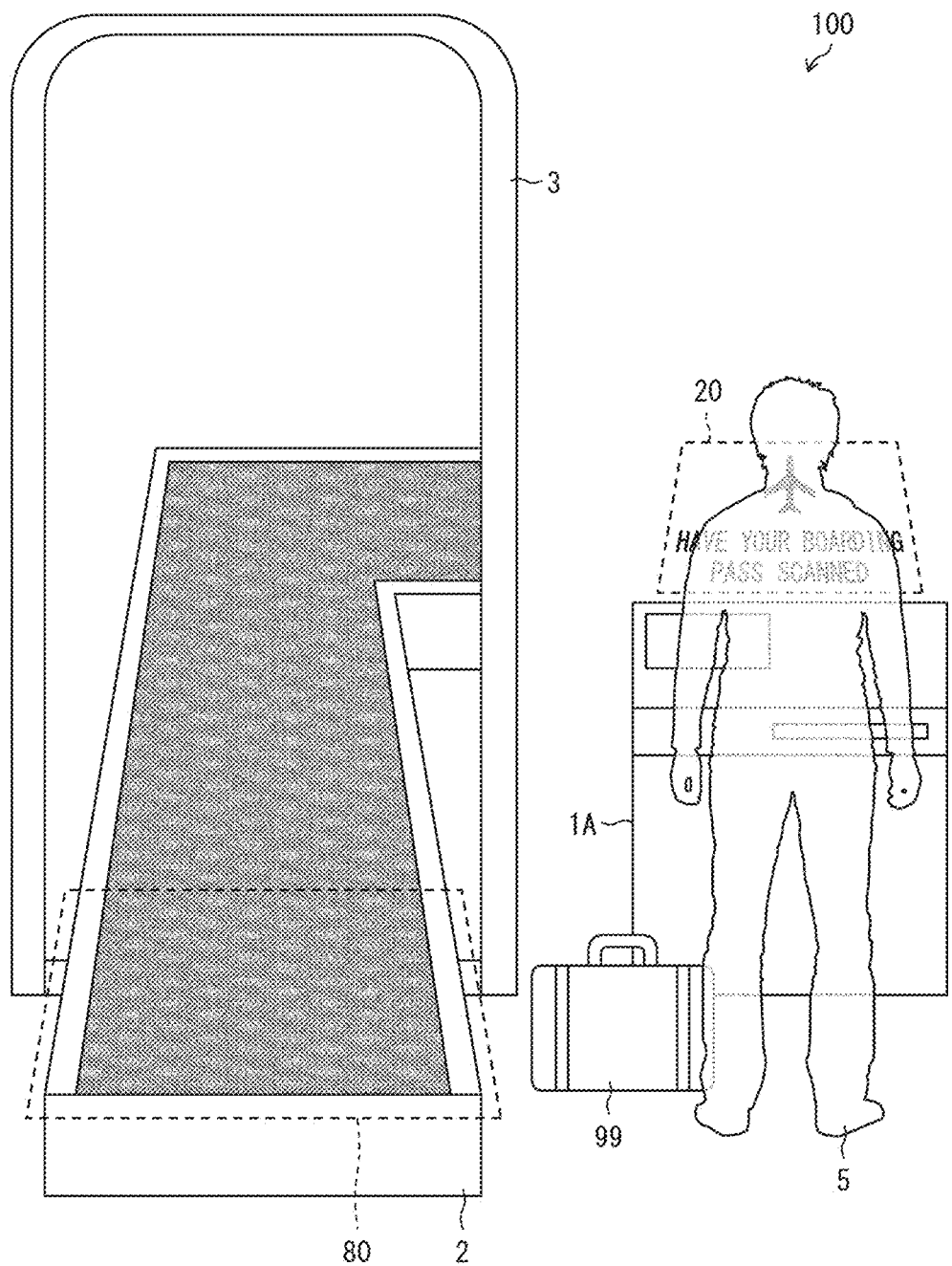
FIG. 11 is a diagram illustrating a specific example of adjusting a direction in which an aerial image is formed.
Figure 12:
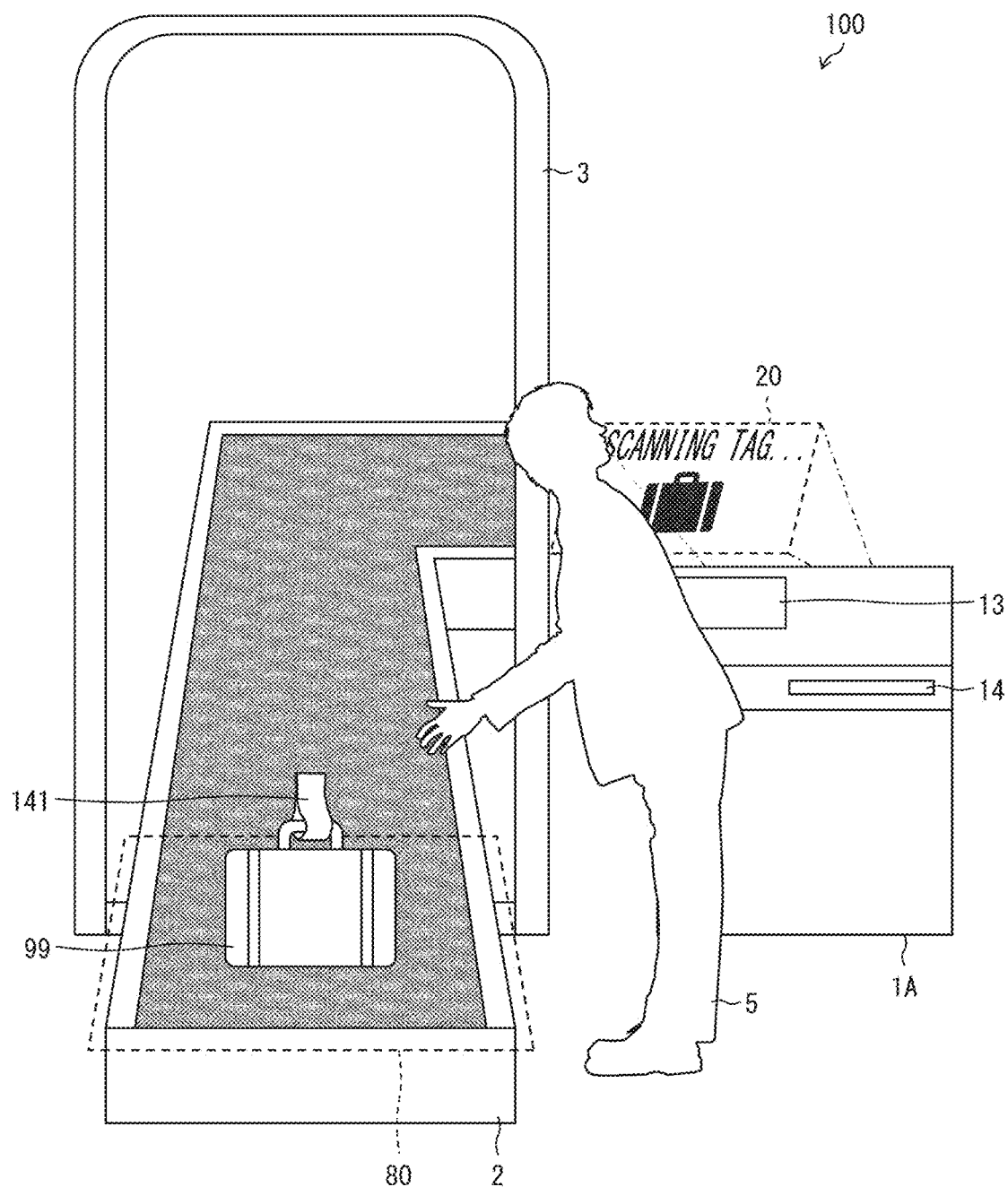
FIG. 12 is a diagram illustrating a specific example of adjusting a direction in which an aerial image is formed.

FIGS. 11 and 12 are diagrams each illustrating a specific example of adjusting a direction in which an aerial image is formed. FIG. 11 illustrates a state in which a user 5 operates the baggage check-in machine 1A while substantially facing the front of the baggage check-in machine 1A, as a stage before placing baggage 99 on the baggage placement area 80.

In this case, the user 5 substantially faces the front of the baggage check-in machine 1A, and therefore the face detection section 106 detects a position of a face of the user in the front direction of the baggage check-in machine 1A. The drive control section 107 controls the actuator 16 in order to adjust the orientation of the display surface of the inner display 11 such that the aerial image 20 is formed in the front direction of the baggage check-in machine 1A. As a result, as illustrated in FIG. 11, the aerial image 20 is formed in the front direction of the baggage check-in machine 1A.

Meanwhile, FIG. 12 illustrates a state in which the user places the baggage 99 on the baggage placement area 80. The user 5 approaches the baggage placement area 80 from the standing position illustrated in FIG. 11 in order to place the baggage 99 on the baggage placement area 80. Therefore, the face detection section 106 detects the position of the face of the user 5 in an oblique direction toward the baggage placement area 80 side, rather than in the front direction of the baggage check-in machine 1A. Therefore, the drive control section 107 controls the actuator 16 in order to adjust the orientation of the display surface of the inner display 11 such that the aerial image 20 is formed in the oblique direction from the baggage check-in machine 1A. As a result, as illustrated in FIG. 12, the aerial image 20 is formed in the oblique direction with respect to the front direction of the baggage check-in machine 1A. In this manner, the baggage check-in machine 1A adjusts the image formation direction of the aerial image 20 in the horizontal direction so as to cause the aerial image 20 to follow the standing position of the user 5.

<Stop of Operation Reception in Adjustment of Image Formation Direction>

In a case where the aerial image 20 is formed toward a user who is away from a position at which a user would substantially face the front of the baggage check-in machine 1A, the baggage check-in machine 1A may be configured not to receive an operation conducted with respect to the aerial image 20.

As a configuration example that realizes this function, in a case where a position of a face detected by the face detection section 106 falls within a predetermined region that includes a position at which a user faces and is in front of the baggage check-in machine 1A, the operation identification section 102 may carry out an identification process (i.e., the operation identification section 102 may be activated). Meanwhile, in a case where the position of the face detected by the face detection section 106 falls outside the predetermined region, the operation identification section 102 may stop the identification process (i.e., the operation identification section 102 may be deactivated). It is possible that the operation identification section 102 is configured to ignore a detection signal from the operation detection section 12, instead of stopping the entire identification process.

As another configuration example, in a case where the position of the face detected by the face detection section 106 falls within the predetermined region, the operation detection section 12 may carry out a detection process (i.e., the operation detection section 12 may be activated). Meanwhile, in a case where the position of the face detected by the face detection section 106 falls outside the predetermined region, the operation detection section 12 may stop the detection process (i.e., the operation detection section 12 may be deactivated). It is possible that the operation detection section 12 is configured to stop output of a detection signal, instead of stopping the entire detection process.

According to the example configurations, it is possible that an operation conducted with respect to the aerial image is accepted when the user exists in the predetermined region that includes a position at which the user faces and is in front of the baggage check-in machine 1A, while a restriction is set such that an operation conducted with respect to the aerial image 20 is not accepted otherwise. This makes it possible to prevent an erroneous operation by a user who is away from the position at which the user would substantially face and be in front of the baggage check-in machine 1A.
<Other Examples of Adjusting Image Formation Direction>

Figure 13:
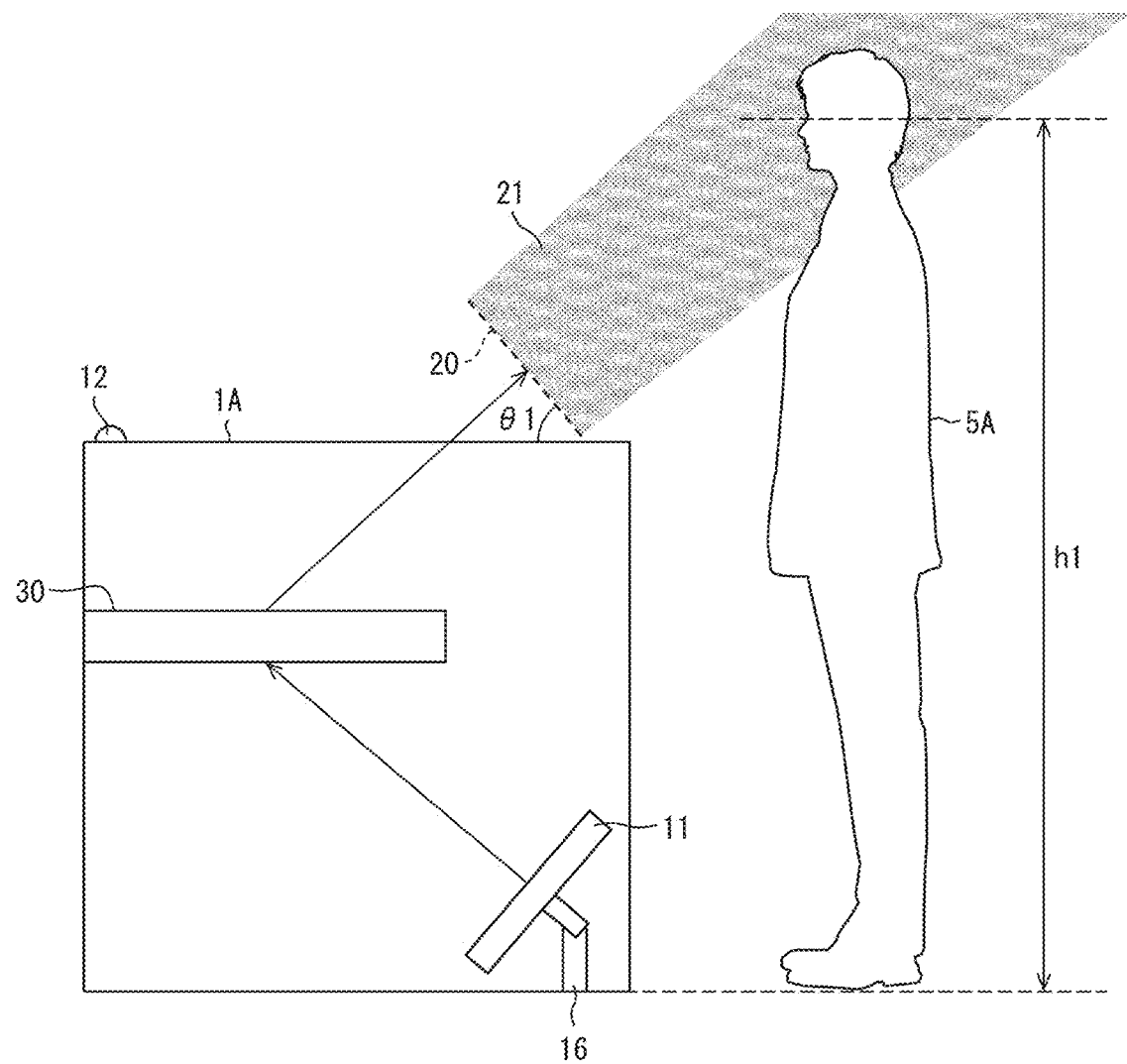
FIG. 13 is a diagram illustrating another example of adjusting a direction in which an aerial image is formed.
Figure 14:
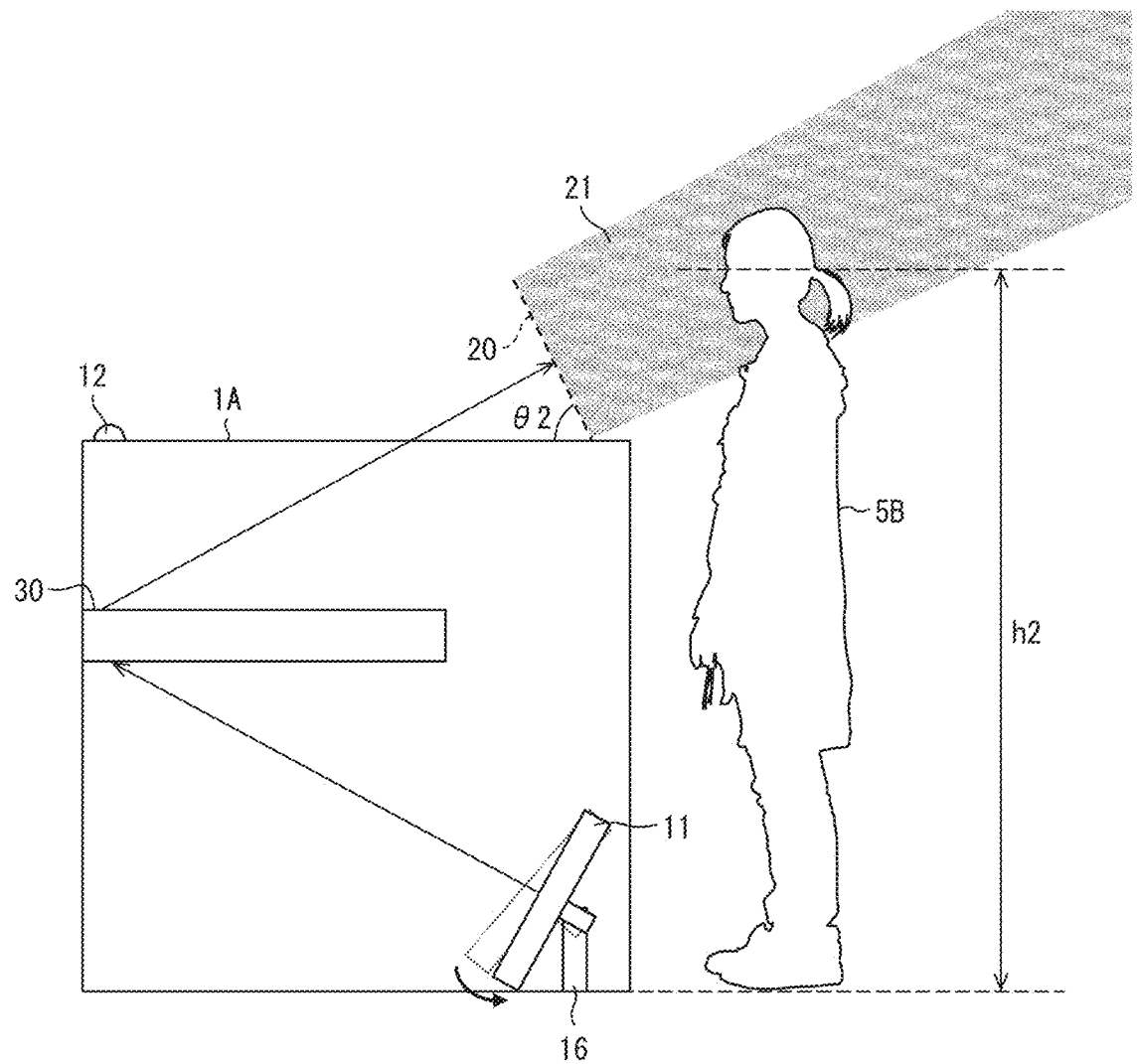
FIG. 14 is a diagram illustrating another example of adjusting a direction in which an aerial image is formed.

FIGS. 13 and 14 are diagrams illustrating other examples of adjusting a direction in which an image is formed. The drive control section 107 may adjust an angle of the aerial image 20 with respect to a top surface of the baggage check-in machine 1A in accordance with a position of a face which has been detected by the face detection section 106. Thus, it is possible to adjust the direction in which the aerial image 20 is formed in the vertical direction in accordance with each of users who vary in height.

In order to realize this function, the baggage check-in machine 1A includes an actuator 16 that rotates the display surface of the inner display 11 about a straight axis extending in the horizontal direction (i.e., the front-back direction in FIGS. 13 and 14). Thus, as illustrated in FIGS. 13 and 14, the direction in which the aerial image 20 is formed can be adjusted in the vertical direction in accordance with the height of the user. When comparing a user 5A illustrated in FIG. 13 with a user 5B illustrated in FIG. 14, a position of a face of the user 5A is relatively high, and a position of a face of the user 5B is relatively low. In other words, a height h1 of the face of the user 5A from a floor surface is higher than a height h2 of the face of the user 5B from the floor surface (h1>h2). Therefore, the drive control section 107 controls the actuator 16 with respect to the user 5A such that the display surface of the inner display 11 is rotated in a direction in which the angle of the aerial image 20 with respect to the top surface of the baggage check-in machine 1A becomes relatively smaller. Thus, in the example of FIG. 13, the angle of the aerial image 20 with respect to the top surface of the baggage check-in machine 1A is an angle θ1. Meanwhile, the drive control section 107 controls the actuator 16 with respect to the user 5B such that the display surface of the inner display 11 is rotated in a direction in which the angle of the aerial image 20 with respect to the top surface of the baggage check-in machine 1A becomes relatively greater. Thus, in the example of FIG. 14, the angle of the aerial image 20 with respect to the top surface of the baggage check-in machine 1A is an angle θ2, which is greater than the angle θ1. As described above, in both cases of the user 5A and the user 5B, the face falls within the observable range 21 of the aerial image 20, as illustrated in FIGS. 13 and 14. Therefore, it is possible to ensure viewability of the aerial image 20.

Figure 15:
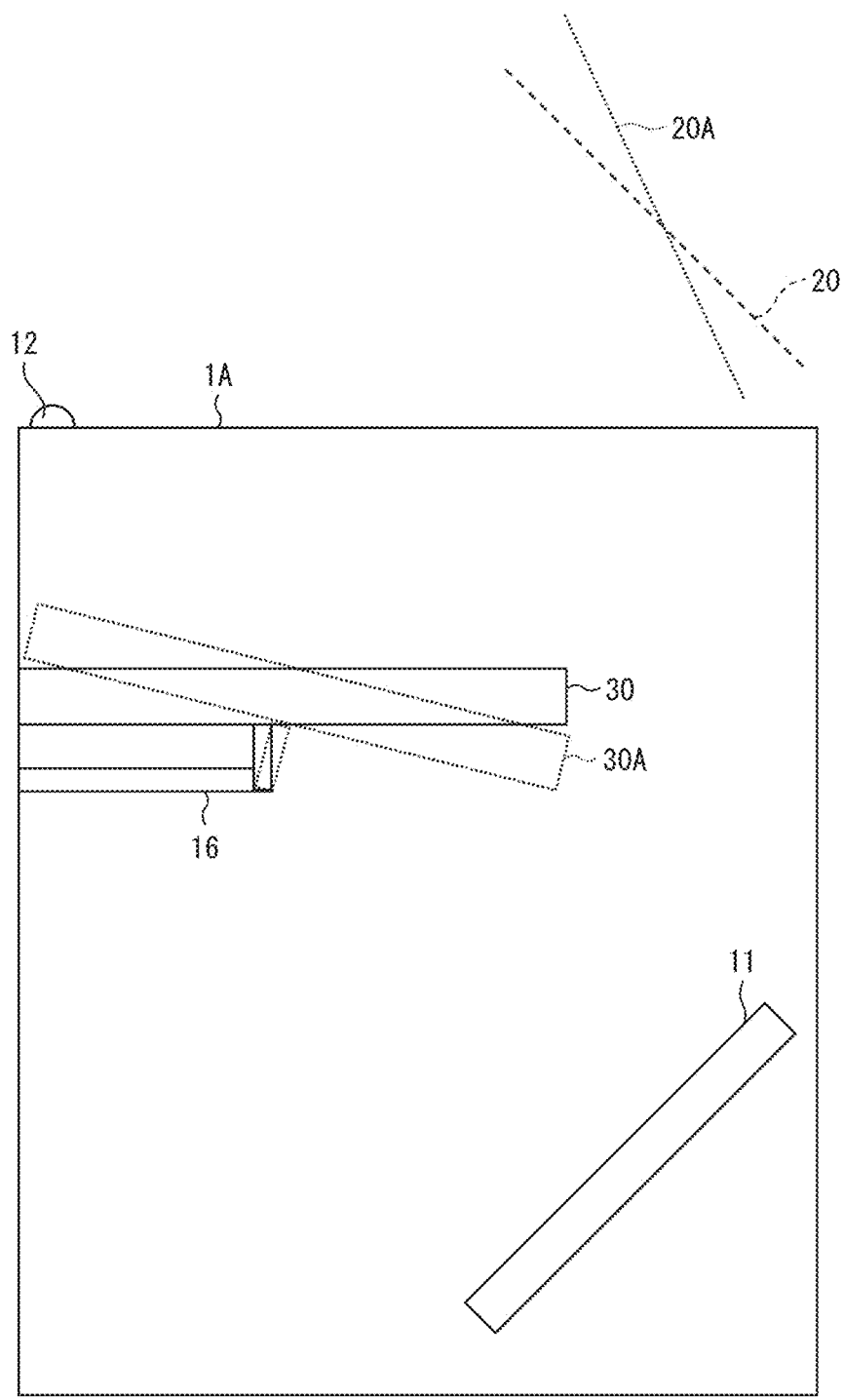
FIG. 15 is a diagram illustrating another example of adjusting a direction in which an aerial image is formed.

FIG. 15 is a diagrams illustrating yet another example of adjusting a direction in which an image is formed. As illustrated in FIG. 15, the actuator 16 may adjust the image formation direction of the aerial image 20 in the vertical direction by moving the image formation section 30 about a straight axis extending in the horizontal direction (the front-back direction in FIG. 15) of the baggage check-in machine 1A. For example, an aerial image 20 is formed with the image formation section 30, while an aerial image 20A is formed with the image formation section 30A which has a different angle from the image formation section 30. With this configuration also, the direction in which the aerial image 20 is formed can be adjusted in the vertical direction in accordance with the height of the user.

The actuator 16 may be configured to move both the inner display 11 and the image formation section 30. This enables more flexible adjustment of the image formation direction.

Functions and Effects

As described above, the baggage check-in machine 1A in accordance with the present embodiment includes the face detection section 106 that detects a position of a face of a user, and the image formation section 30 forms the aerial image 20 toward the position which has been detected.

An aerial image 20 that is formed in air generally has a narrow viewing angle. Therefore, depending on a standing position of a user, the user may not be able to appropriately view the aerial image 20. In contrast, according to the foregoing configuration, the aerial image 20 is formed toward a position of a face of a user who deposits baggage. Therefore, for example, even in a case where the user moves closer to the baggage placement area 80 in order to place the baggage on the baggage placement area 80, the aerial image is formed toward the position of the face of the user who has moved. Further, for example, the aerial image 20 is formed toward a position corresponding to a height of the user. Therefore, it is possible to further ensure viewability of the aerial image 20 and operability of the GUI included in the aerial image 20.

Embodiment 3

Yet another embodiment of the present invention will be described below. A baggage check-in machine 1B in accordance with Embodiment 3 switches between a first mode in which an aerial image 20 is formed and a second mode in which an image is displayed on a display. It is assumed that the second mode is used by employees of an airline company, maintainers, and the like (hereinafter, referred to as "employee or the like") who are not a user who deposits baggage.
<Main Part Configuration of Baggage Check-In Machine 1B>

Figure 16:
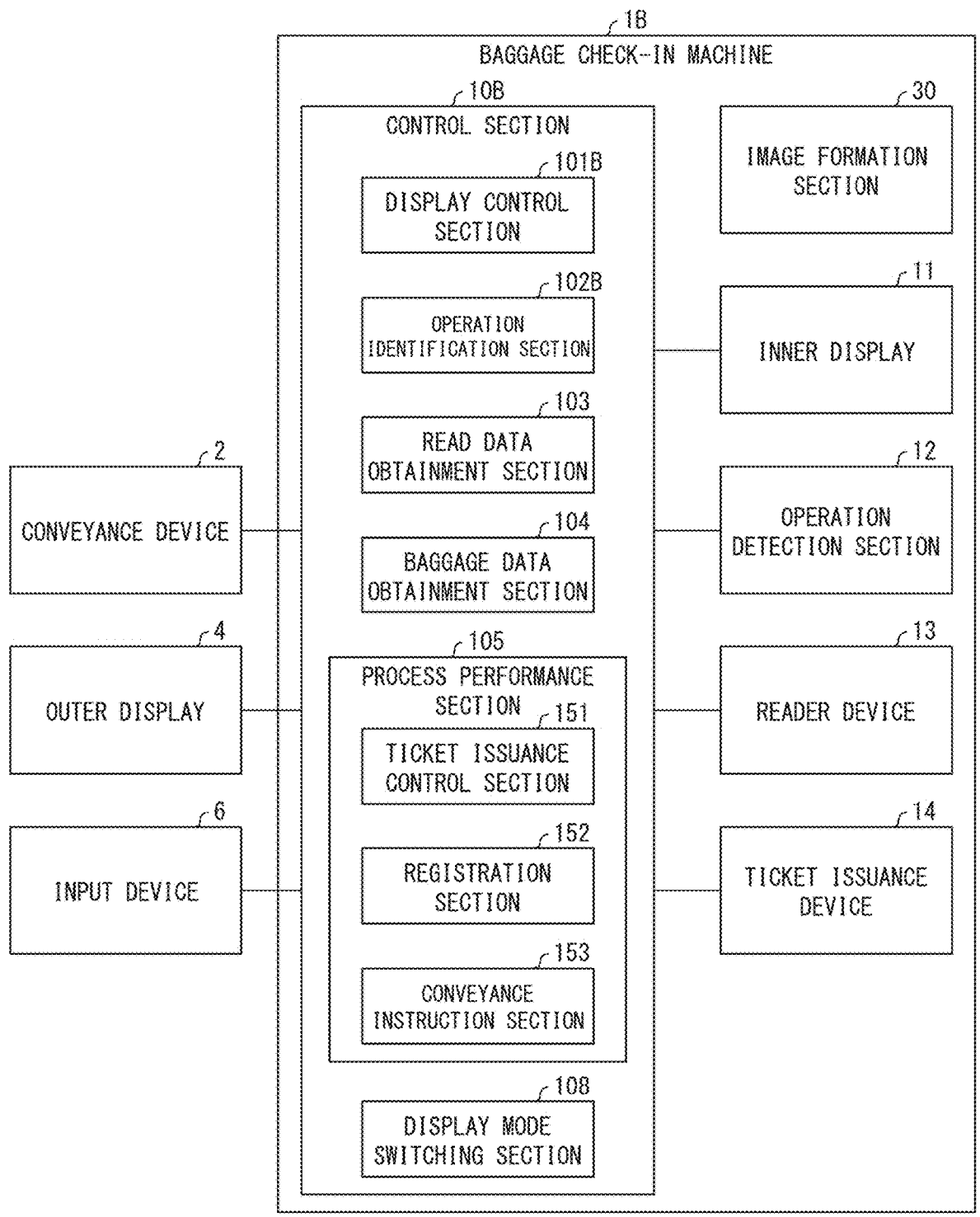
FIG. 16 is a block diagram illustrating an example of a main part configuration of a baggage check-in machine in accordance with Embodiment 3.

FIG. 16 is a block diagram illustrating an example of a main part configuration of the baggage check-in machine 1B. The baggage check-in machine 1B is different from the baggage check-in machine 1 in that the baggage check-in machine 1B includes a control section 10B instead of the control section 10, and is communicatively connected to an outer display 4 (display device) and to an input device 6. In the baggage check-in machine 1B, in addition to display and operation reception by an aerial image 20, functions equivalent to those are realized by the outer display 4 and the input device 6. The outer display 4 and the input device 6 are assumed to be basically used by an employee or the like. However, it is possible that, in a case where an operation conducted with respect to a part of the aerial image 20 which corresponds to an operation target region cannot be identified due to a defect of the operation detection section 12, the operation identification section 102, or the like, a user uses the outer display 4 and the input device 6 as backup means.

The outer display 4 is a display that displays an image on the basis of an instruction from a display control section 101B of the control section 10B, and is typically a liquid crystal display. The image to be displayed on the outer display 4 is the same as the image to be displayed on the inner display 11, and includes a display region and an operation target region.

The input device 6 receives an input operation and outputs an operation signal indicating the input operation to an operation identification section 102B of the control section 10B. The input operation which the input device 6 receives is an operation conducted with respect to a GUI which is an operation target region displayed on the outer display 4. The input device 6 is typically a keyboard and a mouse, but is not limited to these examples. For example, the input device 6 may be a touch panel. In this example, the outer display 4 and the input device 6 may be integrated as a touch panel display.

The control section 10B is different from the control section 10 described above in that the control section 10B includes the display control section 101B and the operation identification section 102B instead of the display control section 101 and the operation identification section 102, respectively, and further includes a display mode switching section 108 (mode switching section).

The display mode switching section 108 switches display modes of the baggage check-in machine 1B. The display mode of the baggage check-in machine 1B includes a first mode in which an image is displayed on the inner display 11 and a second mode in which an image is displayed on the outer display 4. In other words, the first mode is a mode of forming an aerial image 20, and the second mode is a mode of displaying an image on the outer display 4 instead of forming the aerial image 20.

The display control section 101B causes one of the inner display 11 and the outer display 4 to display an image in accordance with the display mode of the baggage check-in machine 1B. In a case where the display mode is the first mode, the display control section 101B causes the inner display 11 to display an image, and forms an aerial image 20. Meanwhile, in a case where the display mode is the second mode, the display control section 101B causes the outer display 4 to display an image.

The operation identification section 102B has a function to obtain an operation signal from the input device 6 to identify an operation, in addition to a function to obtain a detection signal from the operation detection section 12 to identify an operation. The operation identification section 102B identifies an operation based on the obtained operation signal and an image which is displayed on the outer display 4.

The display mode switching section 108 instructs the display control section 101B to switch the display mode based on, for example, an operation signal of a mode switching operation from the input device 6.

Figure 17:
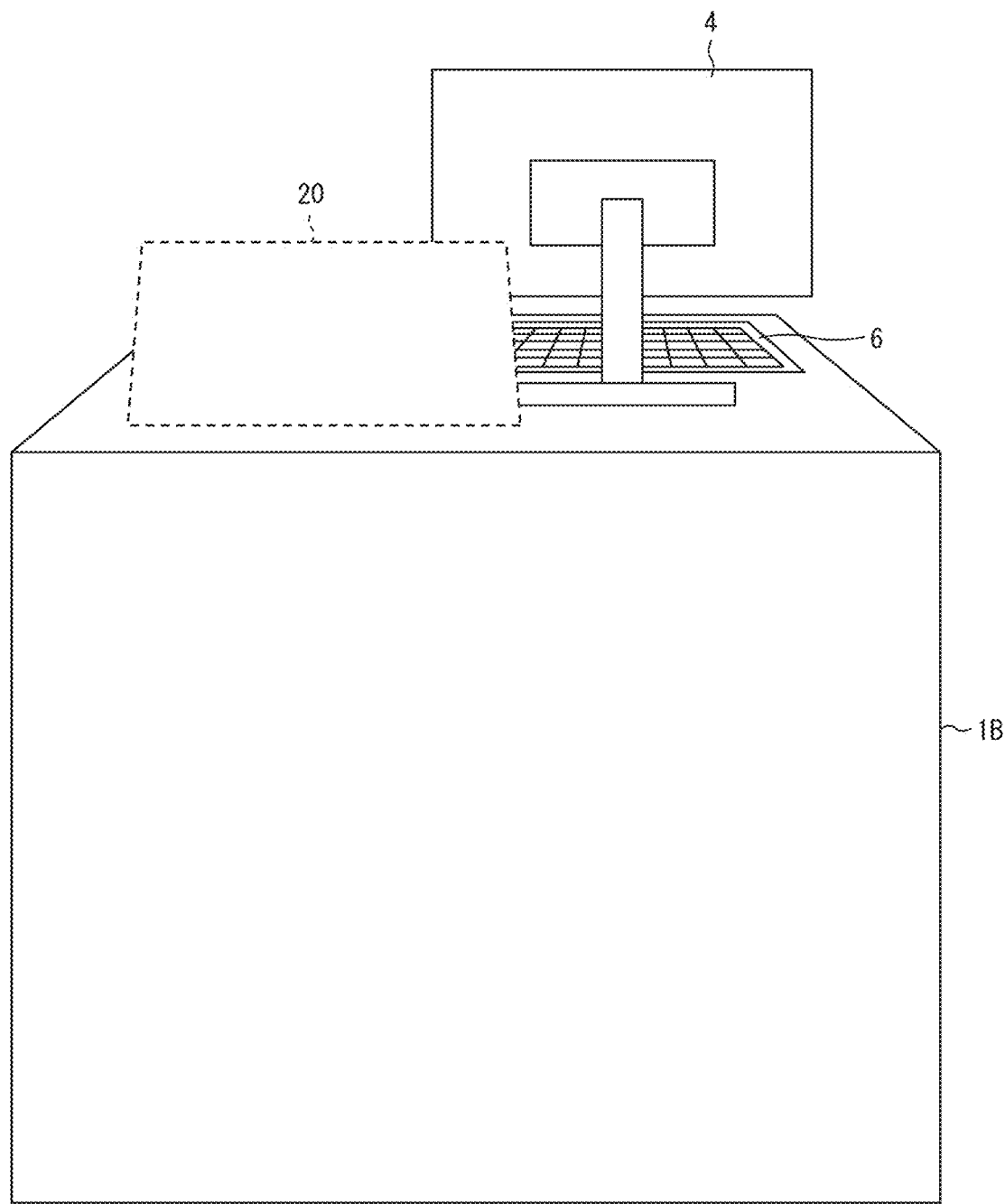
FIG. 17 is a diagram illustrating a disposition example of the baggage check-in machine, the outer display, and the input device which are illustrated in FIG. 16.

It is preferable that the outer display 4 and the input device 6 are installed, for example, at positions that do not interfere with a user who deposits baggage. FIG. 17 is a diagram illustrating an installation example of the outer display 4 and the input device 6. For example, the outer display 4 and the input device 6 may be disposed such that an employee or the like can use the baggage check-in machine 1B from the rear side as illustrated in FIG. 17. The outer display 4 and the input device 6 may also be disposed at positions at which the outer display 4 and the input device 6 are completely invisible to a user who deposits baggage.

Functions and Effects

As described above, the baggage check-in machine 1B in accordance with the present embodiment switches between the first mode in which the aerial image 20 is formed and an operation conducted with respect to GUI is identified and the second mode in which the outer display 4 displays an image and an operation is received. Therefore, for example, to a user who deposits baggage, the first mode can be applied in order to reduce the risk of infection with a virus or the like, while the second mode can be applied to an employee or the like to improve work efficiency.

It is assumed that a user who deposits baggage does not use the outer display 4 and the input device 6. Therefore, the risk of infection of an employee or the like, who uses the outer display 4 and the input device 6, with a virus or the like is relatively low.

Embodiment 4

Still another embodiment of the present invention will be described below. A baggage check-in machine 1C in accordance with Embodiment 4 displays an image (hereinafter, "display-only image") which does not include an operation target region on the outer display 4, in addition to forming an aerial image 20.

<Main Part Configuration of Baggage Check-In Machine 1C>

Figure 18:
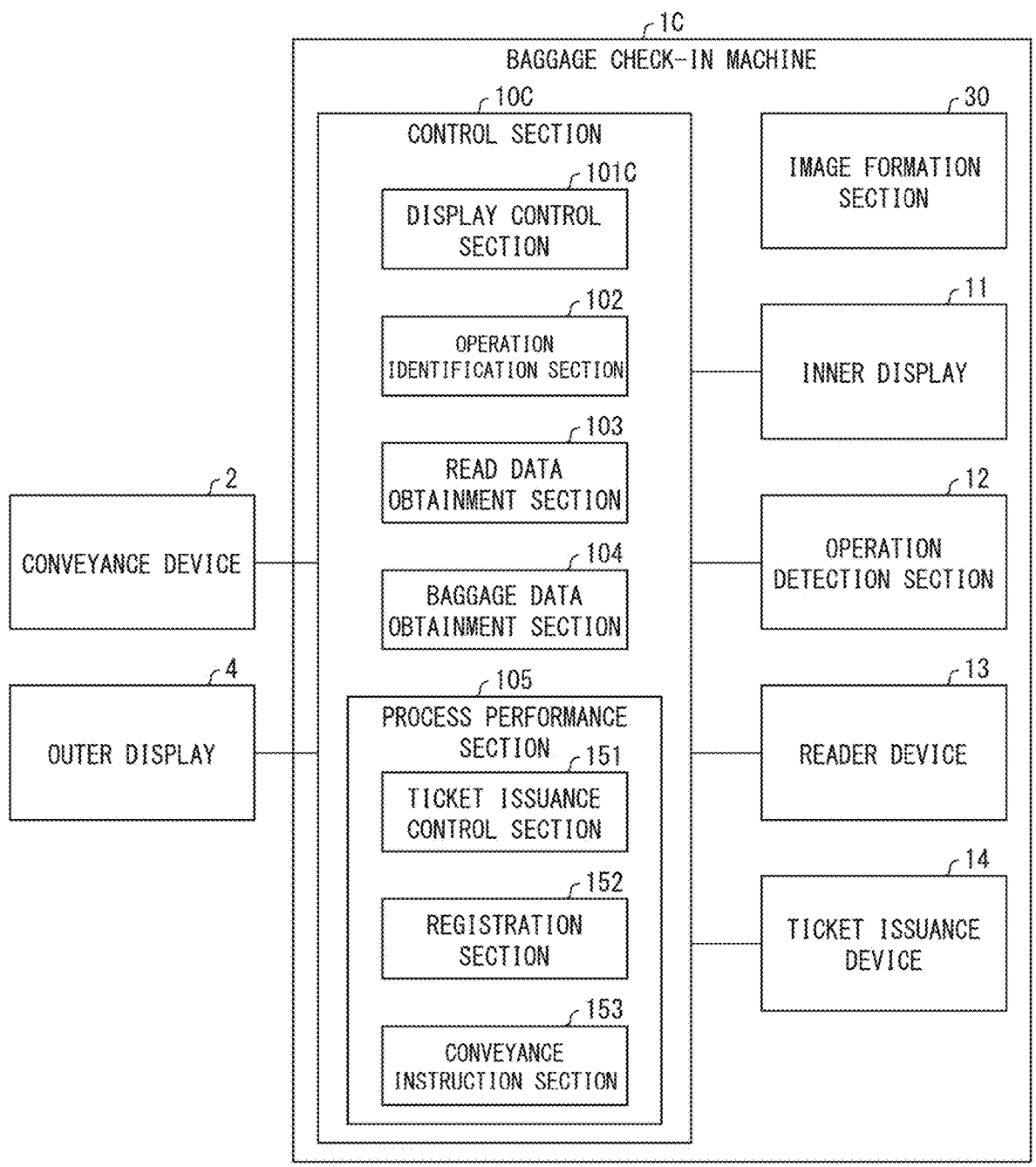
FIG. 18 is a block diagram illustrating an example of a main part configuration of a baggage check-in machine in accordance with Embodiment 4.

FIG. 18 is a block diagram illustrating an example of a main part configuration of the baggage check-in machine 1C in accordance with the present embodiment. The baggage check-in machine 1C is different from the baggage check-in machine 1 in that the baggage check-in machine 1C includes a control section 10C instead of the control section 10, and is communicatively connected to an outer display 4.

The control section 10C is different from the control section 10 described above in that the control section 10C includes a display control section 101C instead of the display control section 101. The display control section 101C, in addition to the functions of the display control section 101, causes the outer display 4 to display a display-only image.

Figure 19:
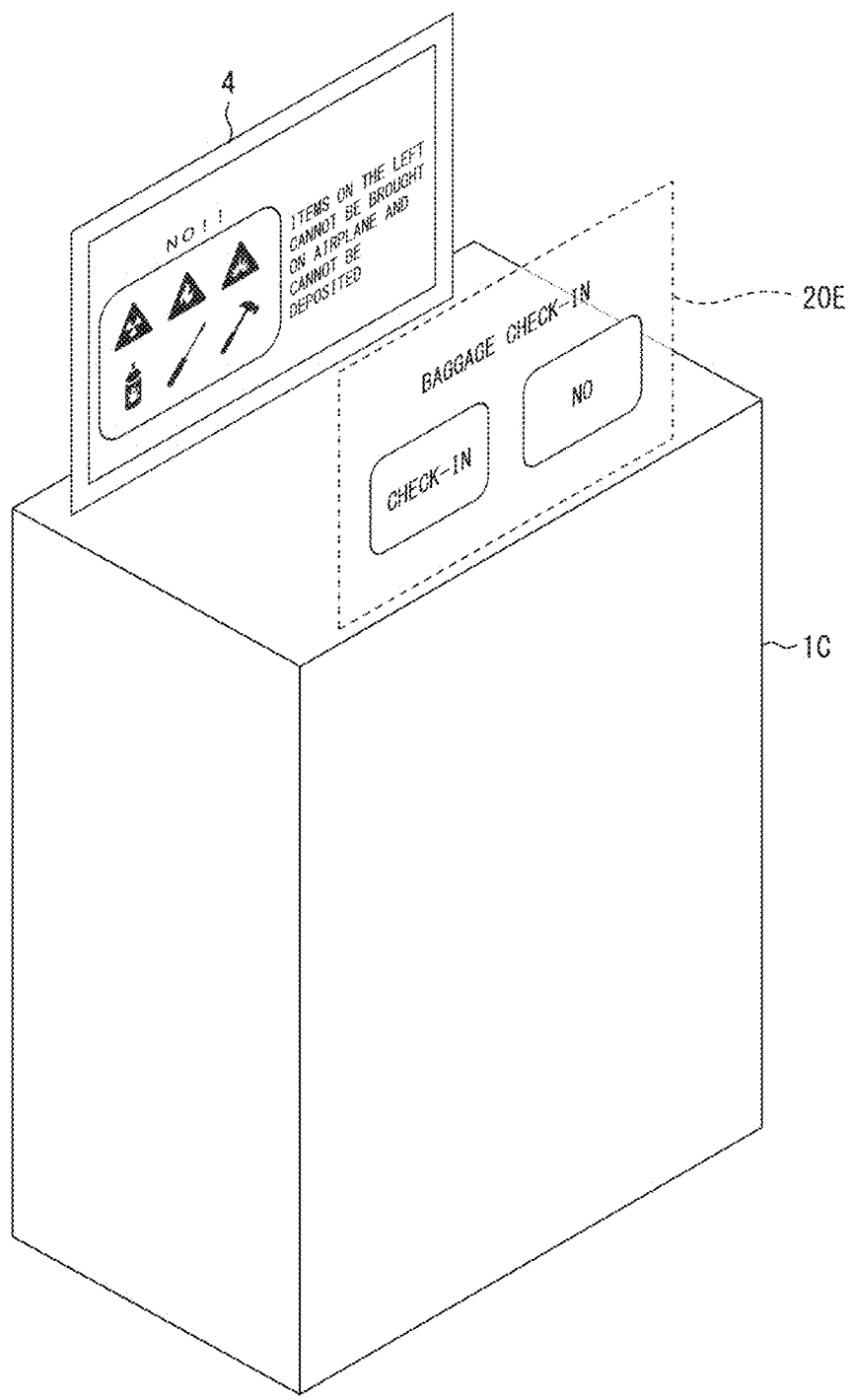
FIG. 19 is a diagram illustrating a display example of the baggage check-in machine illustrated in FIG. 18.

FIG. 19 is a diagram illustrating a display example of the baggage check-in machine 1C. In the example of FIG. 19, in addition to the aerial image 20E illustrated in FIG. 6, a part of an image which is a base of the aerial image 20B is displayed on the outer display 4 as a display-only image.

Functions and Effects

According to the configuration, in addition to the aerial image 20 being formed, a display-only image which does not involve an operation is displayed on the outer display 4. Therefore, it is possible to cause the outer display 4 to display supplementary information which is not indicated in the aerial image 20, or information which should be constantly displayed regardless of transition of the aerial image 20.

Furthermore, the display surface of the outer display 4 usually has a wider viewing angle than the aerial image 20. Therefore, for example, in a case where the user has moved somewhat, and even in a case where there are a plurality of users at different standing positions, it is possible to maintain viewability of information displayed on the outer display 4.

As illustrated in FIG. 19, it is preferable that the outer display 4 is disposed at a position that is farther, from the user, than a position at which the aerial image 20 is formed. This is because, usually, the user does not need to touch the outer display 4. However, the disposition position of the outer display 4 is not limited to this, and the outer display 4 may be disposed within a range that is accessible to the user. For example, the outer display 4 may be disposed at a position (upper side or lower side or left side or right side of the aerial image 20) that is adjacent to the aerial image 20 in the lying direction of the aerial image 20.

Embodiment 5

Still another embodiment of the present invention will be described below.

Overview of Embodiment 5

Figure 20:
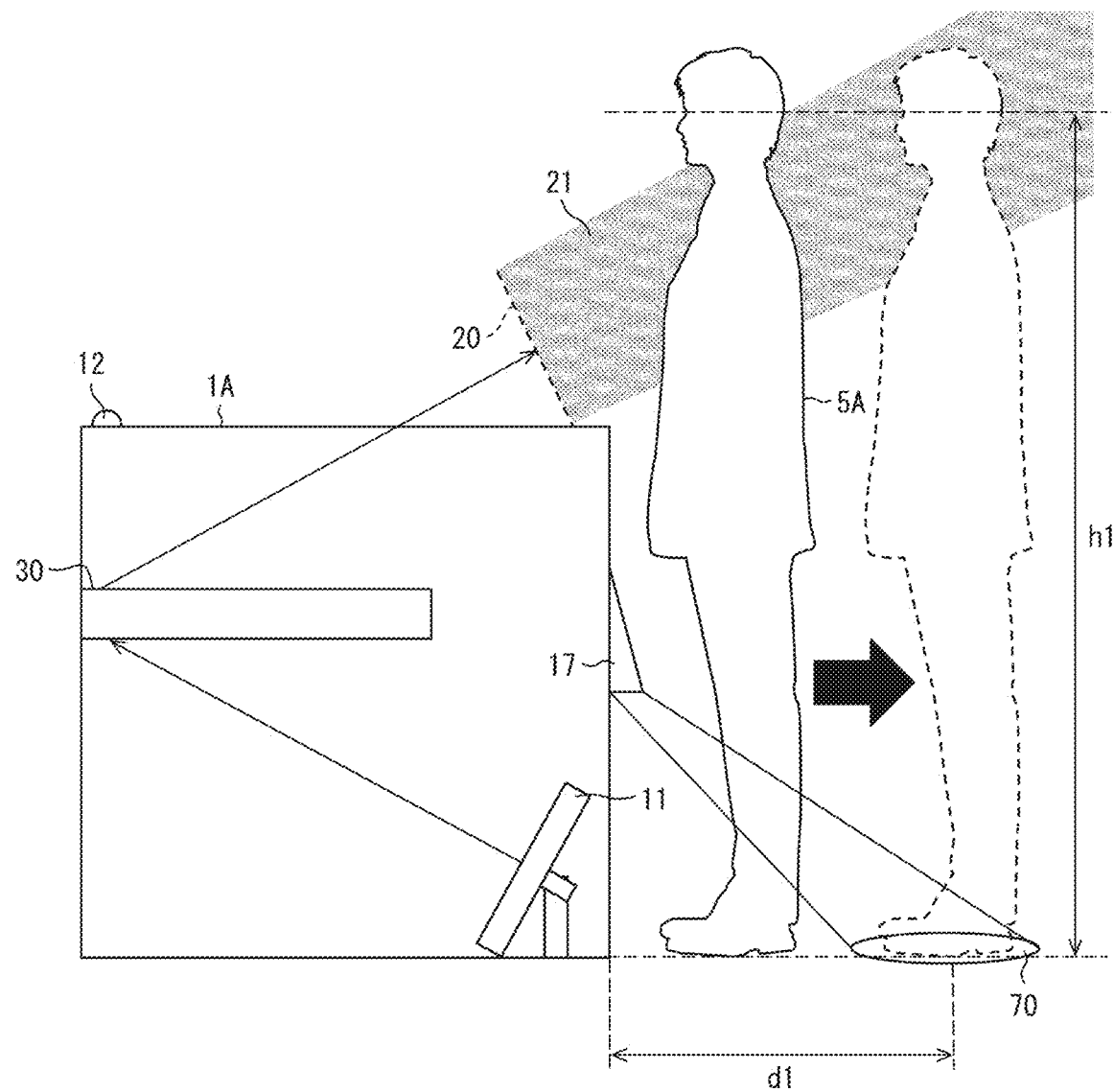
FIG. 20 is a diagram schematically illustrating a baggage check-in machine in accordance with Embodiment 5.
Figure 21:
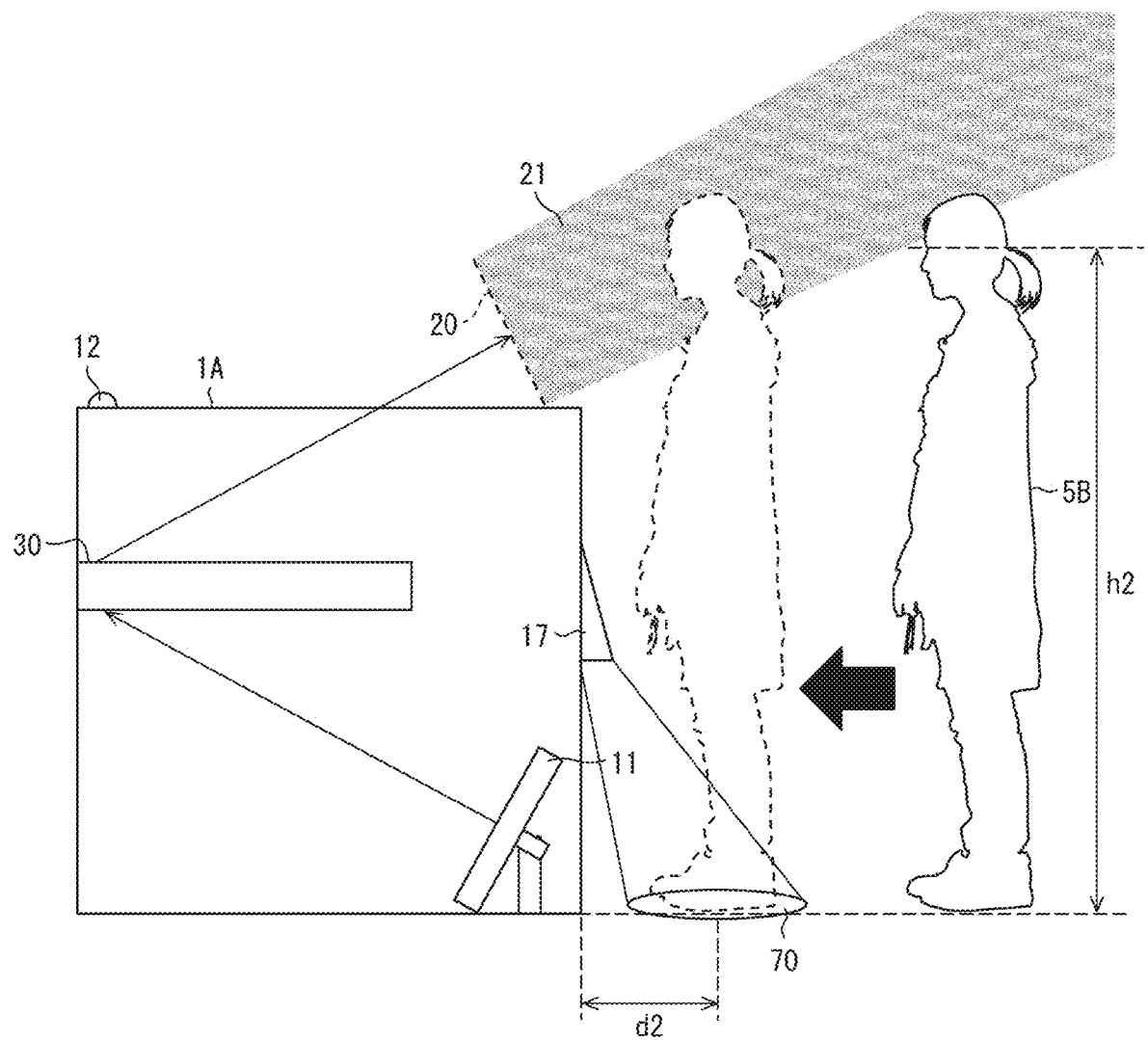
FIG. 21 is a diagram schematically illustrating a baggage check-in machine in accordance with Embodiment 5.

FIG. 20 and FIG. 21 are diagrams each schematically illustrating a baggage check-in machine 1D in accordance with Embodiment 5. The baggage check-in machine 1D does not adjust a direction in which an aerial image 20 is formed, which is carried out by the baggage check-in machine 1A in accordance with Embodiment 2. In other words, the baggage check-in machine 1D does not include a mechanism that changes the orientation of the display surface of the inner display 11. Thus, the direction in which the aerial image 20 is formed is not changed. Therefore, an observable range 21 of the aerial image 20 is also not changed.

The baggage check-in machine 1D projects a projection image 70, which indicates a standing position for a user, on a floor surface in front of the baggage check-in machine 1D, instead of adjusting the direction in which the aerial image is formed. The standing position is, for example, a position on the floor surface on which a user should stand in order to view and operate the aerial image 20. For this purpose, the baggage check-in machine 1D detects a position of a face of the user and determines, in accordance with the position which has been detected, a projection position of the projection image. The projection image 70 is typically an image which is a mark used for a user to stand at a position at which the mark is projected as illustrated in FIGS. 20 and 21.

More specifically, the baggage check-in machine 1D projects the projection image 70 at a standing position at which a face of the user falls within the observable range 21. For example, as illustrated in FIG. 20, a face of a user 5A which upwardly falls outside the observable range 21 can be brought into the observable range 21 if the user 5A moves backward to the projection image 70 which is indicated as a standing position. As a result, the user 5A can view the aerial image 20 and can conduct an operation with respect to a GUI in the aerial image 20.

Similarly, as illustrated in FIG. 21, a face of a user 5B which downwardly falls outside the observable range 21 can be brought into the observable range 21 if the user 5B moves forward to the projection image 70 which is indicated as a standing position. As a result, the user 5B can view the aerial image 20 and can conduct an operation with respect to a GUI in the aerial image 20.

In order to project the projection image 70 on the floor surface, the baggage check-in machine 1D includes an image projection section 17 as illustrated in FIGS. 20 and 21. For example, the image projection section 17 may be a projector that projects an image on the floor surface. In the examples of FIGS. 20 and 21, the image projection section 17 is provided in a front part of the baggage check-in machine 1D, and the projection direction is oriented downward to the front of the baggage check-in machine 1D, in order that the projection image 70 is projected on the floor surface in front of the baggage check-in machine 1D. However, as long as it is possible to project the projection image 70 on the floor surface in front of the baggage check-in machine 1D, the image projection section 17 may be provided at a position other than the front part of the baggage check-in machine 1D.

The observable range 21 of the aerial image 20 is typically, as illustrated in FIGS. 20 and 21, a range that extends from the aerial image 20 upward to the front of the baggage check-in machine 1D. Therefore, a user whose height is relatively high needs to move relatively away from the baggage check-in machine 1D in order that a face of the user falls within the observable range 21, while a user whose height is relatively low needs to move relatively closer to the baggage check-in machine 1D in order that a face of the user falls within the observable range 21. In other words, an appropriate standing position varies depending on the height of the face of the user. Therefore, in this example, in order to change the standing position depending on the user, the baggage check-in machine 1D causes the projection position of the projection image 70 to be farther away from the baggage check-in machine 1D as the height of the detected position of the face of the user from the floor surface increases.

Specifically, when comparing the user 5A illustrated in FIG. 20 with the user 5B illustrated in FIG. 21, a position of a face of the user 5A is relatively high, and a position of a face of the user 5B is relatively low. In other words, a height h1 of the face of the user 5A from a floor surface is higher than a height h2 of the face of the user 5B from the floor surface (h1>h2). Therefore, for the user 5A, the baggage check-in machine 1D causes the projection position of the projection image 70 to be relatively farther away from the baggage check-in machine 1D, for example, sets the projection position to a position at which a distance from the baggage check-in machine 1D is d1. Meanwhile, for the user 5B, the baggage check-in machine 1D causes the projection position of the projection image 70 to be relatively closer to the baggage check-in machine 1D, for example, sets the projection position to a position at which a distance from the baggage check-in machine 1D is d2 (d1>d2). With the configuration, in both cases of FIGS. 20 and 21, if a user stands at a position where the projection image 70 is projected, a face of the user falls within the observable range 21. Therefore, the user can view the aerial image 20. That is, the baggage check-in machine 1D can indicate an appropriate standing position for a user, regardless of the height of the user.

<Main Part Configuration of Baggage Check-In Machine 1D>

Figure 22:
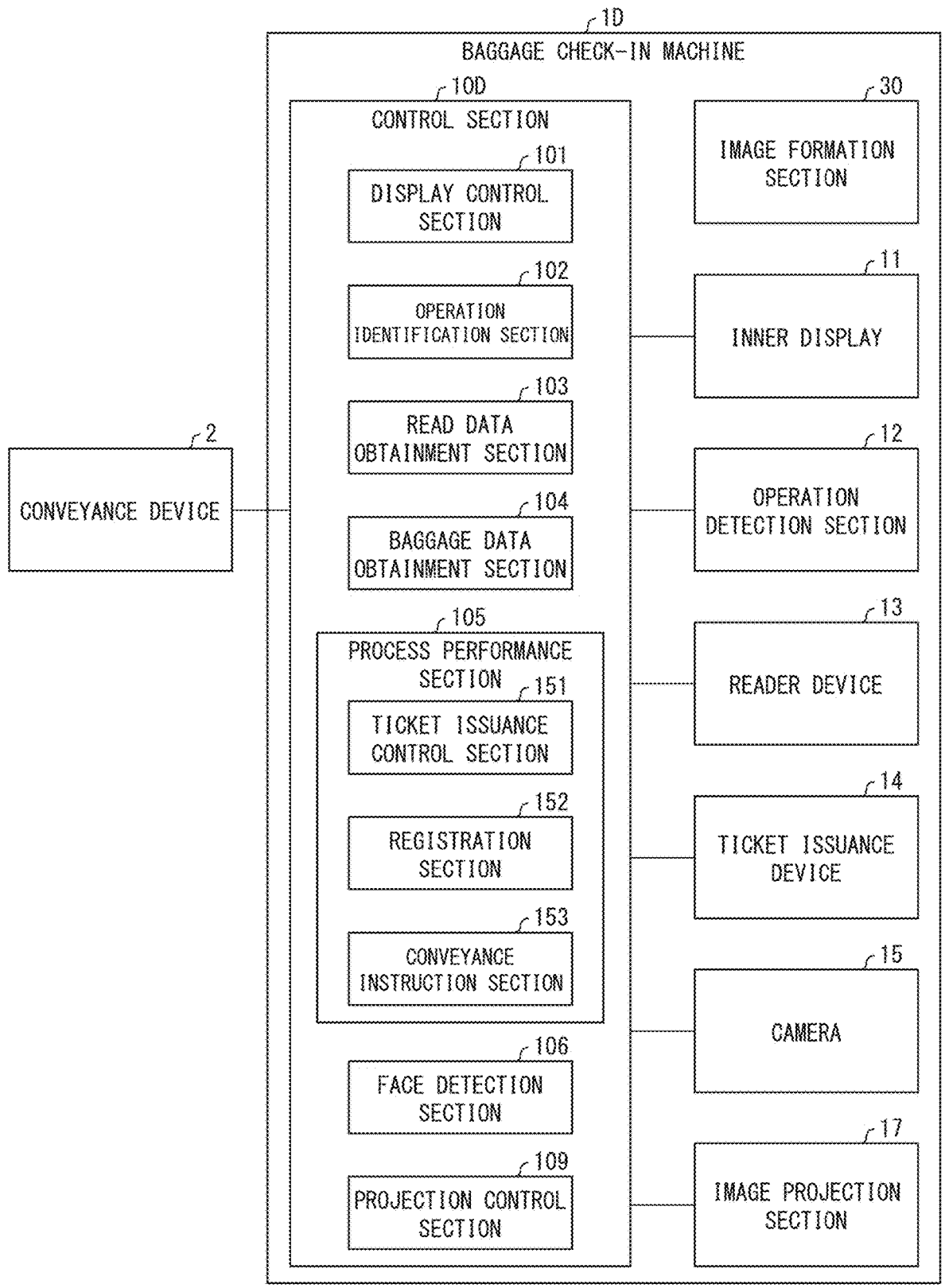
FIG. 22 is a block diagram illustrating an example of a main part configuration of the baggage check-in machine illustrated in FIGS. 20 and 21.

FIG. 22 is a block diagram illustrating an example of a main part configuration of the baggage check-in machine 1D. The baggage check-in machine 1D is different from the baggage check-in machine 1 described above in that the baggage check-in machine 1D includes a control section 10D instead of the control section 10, and includes a camera 15 and the image projection section 17. The camera 15 has been described in Embodiment 2. Therefore, detailed descriptions thereof will not be repeated here.

The image projection section 17 projects the projection image 70 on the floor surface as described above, under control of the control section 10D.

The control section 10D is different from the control section 10 described above in that the control section 10D includes a face detection section 106 and a projection control section 109. The face detection section 106 has been described in Embodiment 2. Therefore, detailed descriptions thereof will not be repeated here. The face detection section 106 in accordance with the present embodiment outputs position information indicating the position which has been detected to the projection control section 109.

The projection control section 109 controls the image projection section 17 to project the projection image 70 at a position on the floor surface based on the obtained position information. For example, the projection control section 109 identifies, based on position information which has been obtained and information indicating the observable range 21, a standing position for a user at which a face of the user would fall within the observable range 21, and controls the image projection section 17 such that the projection image 70 is projected at the standing position.

Specifically, the projection control section 109 causes the projection position of the projection image 70 to be farther away from the baggage check-in machine 1D as the height of the position of the face of the user which is indicated by the obtained position information from the floor surface increases. In other words, in a case where the position of the face of the user is relatively high, the projection control section 109 causes the projection position of the projection image 70 to be relatively farther away from the baggage check-in machine 1D, and in a case where the position of the face of the user is relatively low, the projection control section 109 causes the projection position of the projection image 70 to be relatively closer to the baggage check-in machine 1D. For example, for the user 5A whose face position is relatively high, the projection image 70 is projected at a position at which the distance from the baggage check-in machine 1D is d1, as illustrated in FIG. 20. Meanwhile, for the user 5B whose face position is relatively low, the projection image 70 is projected at a position at which the distance from the baggage check-in machine 1D is d2 which is shorter than d1, as illustrated in FIG. 21.

Functions and Effects

As described above, the baggage check-in machine 1D in accordance with the present embodiment includes the image projection section 17 that projects the projection image 70 on the floor surface in front of the baggage check-in machine 1D, the projection image 70 indicating a standing position for a user.

According to the configuration, the projection image 70 is projected on the floor surface in front of the baggage check-in machine 1D. Therefore, the user can recognize an appropriate standing position.

The baggage check-in machine 1D further includes the face detection section 106 that detects a position of a face of a user, and the projection control section 109 that determines, in accordance with the position which has been detected, a projection position of the projection image 70.

An aerial image 20 that is formed in air generally has a narrow viewing angle. Therefore, depending on a standing position of a user, the user may not be able to appropriately view the aerial image 20. In contrast, according to the configuration, the image projection section 17 projects the projection image 70 at a position corresponding to the position of the face of the user. Therefore, it is possible to indicate, to a user, a standing position at which the face of the user falls within the observable range 21, which varies depending on the height of the user. Therefore, the baggage check-in machine 1D can ensure viewability of the aerial image 20 and operability of the GUI included in the aerial image 20.

The projection control section 109 causes the projection position of the projection image 70 to be farther away from the baggage check-in machine 1D as the height of the detected position of the face of the user from the floor surface increases.

The observable range 21 of the aerial image 20 is typically a range that extends from the aerial image 20 upward to the front of the baggage check-in machine 1D. Therefore, a user whose height is relatively high needs to move relatively away from the baggage check-in machine 1D in order that the face of the user falls within the observable range 21, while a user whose height is relatively low needs to move relatively closer to the baggage check-in machine 1D in order that the face of the user falls within the observable range 21. In other words, an appropriate standing position varies depending on the height of the face of the user. Here, according to the configuration, as the height of the detected position of the face of the user from the floor surface increases, the projection position of the projection image 70 is caused to be farther away from the baggage check-in machine 1D. Therefore, it is possible to indicate an appropriate standing position for any user, regardless of the height of the user.

It is assumed that the baggage check-in machine 1D does not adjust the direction in which the aerial image 20 is formed. However, it is possible to project the projection image 70 while adjusting the direction in which the aerial image 20 is formed. In this example, the baggage check-in machine 1D includes the actuator 16 and the drive control section 107 which have been described in Embodiment 2. Detailed descriptions of the actuator 16 and the drive control section 107 will not be repeated here.

If there is a limit in an adjustable range of the image formation direction of the aerial image 20, it is considered that, depending on the height of the user, the aerial image is not formed toward the position of the face of the user even if the image formation direction is adjusted. In contrast, according to the configuration, the projection image 70 is projected to prompt the user to move to a standing position at which the face of the user falls within the observable range 21.

Alternatively, it is possible that the baggage check-in machine 1D is configured not to include the face detection section 106. In this example, it is possible that the baggage check-in machine 1D is configured such that a plurality of projection images 70 are constantly projected in front of the baggage check-in machine 1D. The plurality of projection images 70 are, for example, respective images which show different numerical ranges of heights of users and are, for example, an image which indicates "150 to 159 cm", an image which indicates "160 to 169 cm", and an image which indicates "170 to 179 cm". In this case, a user of the baggage check-in machine 1D can view the aerial image 20 if the user stands at a projection position of the projection image 70 which indicates a numerical range within which the height of the user falls.

The projection image 70 is not limited to an image that indicates a region itself of a standing position as illustrated in FIGS. 20 and 21, but may be an image that enables a user to recognize a part where the standing position is substantially located. For example, the projection image 70 may be an image (e.g., an arrow or the like) which is projected around a standing position to indicate the standing position.

[Variation]

In each of the embodiments described above, the aerial image 20 may be a stereoscopic image. According to this configuration, it is possible to increase understandability of a user who views the aerial image 20. For example, it is possible to illustrate a description related to the depth direction of baggage or the baggage placement area 80 using a stereoscopic image. Moreover, it is possible to illustrate an attachment position of a baggage tag with respect to baggage that is shown in a stereoscopic image.

In the embodiments described above, the baggage check-in machines 1 and 1A through 1D have been described to be configured to have the function for issuance of a baggage tag. However, the baggage tag may be issued in advance by a device different from the baggage check-in machines 1 and 1A through 1D. In this case, the baggage check-in machines 1 and 1A through 1D do not need to have the function described with reference to FIGS. 5 and 6.

In the above described embodiments, it has been described that a user has already obtained a boarding pass when the user uses any of the baggage check-in machines 1 and 1A through 1D. However, instead of such a procedure, a boarding pass may be issued by the baggage check-in machines 1 and 1A through 1D. In this case, it is possible in the baggage check-in machines 1 and 1A through 1D that, similarly to other operations, an operation related to issuance of a boarding pass is conducted with respect to the aerial image 20 so that the ticket issuance device 14 issues a boarding pass. Thus, it is possible to reduce the risk of infection with a virus or the like from the stage at which a boarding pass is issued.

[Example of Configuration Achieved by Software]

The control blocks (in particular, control sections 10 and 10A through 10D) of the baggage check-in machines 1 and 1A through 1D each can be realized by a logic circuit (hardware) formed on an integrated circuit (IC chip) or the like or can be alternatively realized by software.

In the latter case, the baggage check-in machines 1 and 1A through 1D each include a computer that executes instructions of a program that is software realizing the foregoing functions. The computer includes, for example, at least one processor and a computer-readable storage medium storing the program. The object of the present invention can be achieved by the processor of the computer reading and executing the program stored in the storage medium. Examples of the processor encompass a central processing unit (CPU). Examples of the storage medium encompass a "non-transitory tangible medium" such as a read only memory (ROM), a tape, a disk, a card, a semiconductor memory, and a programmable logic circuit. The computer may further include a random access memory (RAM) or the like in which the program is loaded. Further, the program may be supplied to the computer via any transmission medium (such as a communication network and a broadcast wave) which allows the program to be transmitted. Note that an aspect of the present invention can also be achieved in the form of a computer data signal in which the program is embodied via electronic transmission and which is embedded in a carrier wave.

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST 1, 1A-1D: Baggage check-in machine
2: Conveyance device
4: Outer display (display device)
11: Inner display (display section)
12: Operation detection section (object detection section)
14: Ticket issuance device (tag issuance section, claim ticket issuance section)
17: Image projection section
20, 20A-20M: Aerial image
30, 30A: Image formation section
80: Baggage placement area
99: Baggage
101, 101B, 101C: Display control section
102, 102B, 102C: Operation identification section
105: Process performance section
106: Face detection section
108: Display mode switching section (mode switching section)
109: Projection control section
141: Baggage tag (tag)

The invention claimed is:

1. A baggage check-in machine, comprising:
   a display section that displays an image which includes an operation target region and which is related to baggage check-in;
   an image formation section that causes the image displayed on the display section to be formed as an aerial image in air around said baggage check-in machine;
   an operation identification section that identifies an operation conducted by a user with respect to a part in the aerial image which corresponds to the operation target region; and
   a process performance section that carries out, in accordance with the operation which has been identified, a process related to the baggage check-in.

2. The baggage check-in machine as set forth in claim 1, wherein:
   said baggage check-in machine is provided in a vicinity of a baggage placement area included in a conveyance device that conveys the baggage;
   the user is a person who deposits the baggage at the baggage placement area; and
   the display section and the image formation section are disposed such that the aerial image is formed at a position which allows the user to view the aerial image and to conduct the operation.

3. The baggage check-in machine as set forth in claim 2, further comprising:
   a face detection section that detects a position of a face of the user,
   the image formation section forming the aerial image toward the position which has been detected.

4. The baggage check-in machine as set forth in claim 3, wherein:
   in a case where the position which has been detected falls within a predetermined region that includes a position at which the user faces and is in front of said baggage check-in machine, the operation identification section identifies the operation; and
   in a case where the position which has been detected falls outside the predetermined region, the operation identification section stops identification of the operation.

5. The baggage check-in machine as set forth in claim 3, wherein:
   in a case where the position which has been detected falls within a predetermined region that includes a position at which the user faces and is in front of said baggage check-in machine, an object detection section carries out detection for detecting an object in a vicinity of a position at which the aerial image is formed; and
   in a case where the position which has been detected falls outside the predetermined region, the object detection section stops detection of the object.

6. The baggage check-in machine as set forth in claim 1, further comprising:
   a display control section that controls the display section and a display device to display the image; and
   a mode switching section that switches between a mode in which the display control section controls the display section to display the image and a mode in which control section controls the display device to display the image, the operation identification section further identifying an operation conducted with respect to the operation target region in the image which is displayed on the display device.

7. The baggage check-in machine as set forth in claim 1, further comprising a display control section that controls a display device to display a display-only image which does not include the operation target region.

8. The baggage check-in machine as set forth in claim 1, wherein the aerial image is a stereoscopic image.

9. A baggage check-in machine, comprising:
a display section that displays an image which includes an operation target region and which is related to baggage check-in;
an image formation section that causes the image displayed on the display section to be formed as an aerial image in air around said baggage check-in machine;
an operation identification section that identifies an operation conducted by a user with respect to a part in the aerial image which corresponds to the operation target region;
a process performance section that carries out, in accordance with the operation which has been identified, a process related to the baggage check-in; and
an image projection section that projects a projection image on a floor surface in front of said baggage check-in machine, the projection image indicating a standing position the display for the user.

10. The baggage check-in machine as set forth in claim 9, further comprising:
a face detection section that detects a position of a face of the user; and
a projection control section that determines, in accordance with the position which has been detected, a projection position of the projection image.

11. The baggage check-in machine as set forth in claim 10, wherein the projection control section causes the projection position to be farther away from said baggage check-in machine as a height of the position which has been detected from the floor surface increases.

* * * * *